(12) United States Patent
Elias et al.

(10) Patent No.: US 11,466,745 B2
(45) Date of Patent: Oct. 11, 2022

(54) APPARATUS AND METHOD FOR SUPPRESSING OSCILLATIONS

(71) Applicant: Steadiwear Inc., Toronto (CA)

(72) Inventors: Mark Elias, Toronto (CA); Leonardo Araneta, Toronto (CA); Emile Maamary, Toronto (CA); Hadi Mohammadi, Kelowna (CA); Stephen Kimanzi, Kelowna (CA)

(73) Assignee: Steadiwear Inc., Toronto (CA)

( * ) Notice: Subject to any disclaimer, the term of this patent is extended or adjusted under 35 U.S.C. 154(b) by 371 days.

(21) Appl. No.: 16/719,039

(22) Filed: Dec. 18, 2019

(65) Prior Publication Data

US 2020/0124128 A1    Apr. 23, 2020

Related U.S. Application Data

(63) Continuation-in-part of application No. PCT/CA2019/050855, filed on Jun. 18, 2019.
(Continued)

(51) Int. Cl.
  *F16F 15/03*   (2006.01)
  *F16F 7/104*   (2006.01)
  *H01F 7/02*    (2006.01)

(52) U.S. Cl.
  CPC ............... *F16F 7/104* (2013.01); *H01F 7/02* (2013.01)

(58) Field of Classification Search
  CPC .. F16F 7/10; F16F 7/104; F16F 7/1011; F16F 15/03; H01F 7/02
  See application file for complete search history.

(56) References Cited

U.S. PATENT DOCUMENTS 3,614,126 A * 10/1971 Carlson .................. F16F 7/104
                                                                280/758
5,236,186 A *  8/1993 Weltin .................... F16F 15/03
                                                                267/136
(Continued)

FOREIGN PATENT DOCUMENTS

CN       202023272 U    11/2011
CN       203784189 U     8/2014
(Continued)

OTHER PUBLICATIONS

Machine translation of CN 203905194 (no date).*
(Continued)

*Primary Examiner* — Nicholas J Lane
(74) *Attorney, Agent, or Firm* — Bereskin & Parr LLP/S.E.N.C.R.L., s.r.l.; Isis E. Caulder; Nicholas Aitken

(57) ABSTRACT

An apparatus for suppressing oscillations of an oscillating body includes a magnetic base and a magnetic stabilizing mass pivotably coupled to the magnetic base by a pivot assembly. The pivot assembly defines a pivot axis about which the magnetic stabilizing mass is pivotable, relative to the magnetic base, between a first position and a second position. The magnetic stabilizing mass has an equilibrium position between the first position and the second position. The magnetic base produces magnetic fields that magnetically repel the magnetic stabilizing mass away from the first position at least when the magnetic stabilizing mass is offset from the equilibrium position toward the first position, and that magnetically repel the magnetic stabilizing mass away from the second position at least when the magnetic stabilizing mass is offset from the equilibrium position toward the second position.

17 Claims, 15 Drawing Sheets

Related U.S. Application Data

(60) Provisional application No. 62/686,885, filed on Jun. 19, 2018.

(56) References Cited

U.S. PATENT DOCUMENTS

| | | | |
|---|---|---|---|
| 6,458,089 | B1 | 10/2002 | Ziv-Av |
| 6,636,136 | B1 | 10/2003 | Radziun et al. |
| 7,038,341 | B1* | 5/2006 | Wang ................. H02K 7/09 |
| | | | 310/90.5 |
| 9,457,635 | B2 | 10/2016 | Pepka |
| 10,655,698 | B2* | 5/2020 | Lee ................ B60G 17/0195 |
| 2002/0003327 | A1 | 1/2002 | Enoki et al. |
| 2003/0006357 | A1 | 1/2003 | Kaiser et al. |
| 2013/0326969 | A1* | 12/2013 | Kienholz ............. E04H 9/0215 |
| | | | 52/167.2 |
| 2017/0108034 | A1* | 4/2017 | McGuire ............ F16C 11/0604 |
| 2018/0266820 | A1* | 9/2018 | De Panisse ............ G01C 19/42 |
| 2020/0188223 | A1* | 6/2020 | Nguyen ............... A61H 23/004 |
| 2021/0047998 | A1* | 2/2021 | Mitsch .................... F16F 7/10 |

FOREIGN PATENT DOCUMENTS

| | | | |
|---|---|---|---|
| CN | 203905194 U | * 10/2014 | ............. E01D 19/00 |
| CN | 104264854 A | 1/2015 | |
| CN | 107228147 A | 10/2017 | |
| DE | 19621700 A1 | 12/1997 | |
| WO | 2016102958 A1 | 6/2016 | |

OTHER PUBLICATIONS

International Search Report and Written Opinion dated Sep. 16, 2019 in corresponding International Patent Application No. PCT/CA2019/050855 (7 pages).

Masoumi, "Passive Hand Tremor Attenuator: Magnetic Spring", Master's Thesis, University of British Columbia, Dkanagan, Canada, Jun. 2018, 99 pages.

* cited by examiner

APPARATUS AND METHOD FOR SUPPRESSING OSCILLATIONS

FIELD OF THE INVENTION

This disclosure relates generally to apparatus and methods for suppressing oscillations of an oscillating body.

BACKGROUND

An unwanted oscillation is a periodic (e.g. reciprocating) movement exhibited by a body (e.g. person or device), which has a negative (e.g. detrimental) impact, such as for example a loss of accuracy, control, or stability. Suppressing (i.e. reducing) the unwanted oscillation may mitigate the negative impact.

SUMMARY

In one aspect, an apparatus for suppressing oscillations of an oscillating body is provided. The apparatus may include a magnetic housing and a magnetic stabilizing mass. The magnetic housing may be securable to the oscillating body. The magnetic housing may define a housing interior. The magnetic stabilizing mass may be slideably coupled to the magnetic housing in the housing interior by a bearing assembly. The magnetic stabilizing mass may be slideable between a first position and a second position. The magnetic stabilizing mass may have an equilibrium position between the first position and the second position. The magnetic housing may produce magnetic fields that magnetically repel the magnetic stabilizing mass away from the first position at least when the magnetic stabilizing mass is offset from the equilibrium position toward the first position, and that magnetically repel the magnetic stabilizing mass away from the second position at least when the magnetic stabilizing mass is offset from the equilibrium position toward the second position.

In another aspect, a method of suppressing oscillations of an oscillating body is provided. The method may include securing a magnetic housing to the oscillating body, the magnetic housing containing a magnetic stabilizing mass slideable between a first position and a second position through an equilibrium position; and in response to an oscillation of the oscillating body, the secured magnetic housing magnetically repelling the magnetic stabilizing mass away from the first position and second positions toward the equilibrium position, suppressing the oscillation.

In another aspect, an apparatus for suppressing oscillations of an oscillating body is provided. The apparatus may include a magnetic base and a magnetic stabilizing mass. The magnetic base may be securable to the oscillating body. The magnetic stabilizing base may be pivotably coupled to the magnetic base by a pivot assembly. The magnetic stabilizing mass may be pivotable between at least a first position and a second position. The magnetic stabilizing mass may have an equilibrium position between the first position and the second position. The magnetic base may produce magnetic fields that magnetically repel the magnetic stabilizing mass away from the first position at least when the magnetic stabilizing mass is offset from the equilibrium position toward the first position, and that magnetically repel the magnetic stabilizing mass away from the second position at least when the magnetic stabilizing mass is offset from the equilibrium position toward the second position.

In another aspect, an apparatus for suppressing oscillations of an oscillating body is provided. The apparatus may include a magnetic base and a magnetic stabilizing mass. The magnetic base may be securable to the oscillating body. The magnetic stabilizing base may be pivotably coupled to the magnetic base by a pivot assembly. The magnetic stabilizing mass may be pivotable between at least a first position and a second position. The magnetic stabilizing mass may have an equilibrium position between the first position and the second position. Each of the magnetic base and magnetic stabilizing mass may be circular. The magnetic base may produce magnetic fields that magnetically repel the magnetic stabilizing mass away from the first position at least when the magnetic stabilizing mass is offset from the equilibrium position toward the first position, and that magnetically repel the magnetic stabilizing mass away from the second position at least when the magnetic stabilizing mass is offset from the equilibrium position toward the second position. The pivot assembly may include a spacer rod extending generally perpendicularly from the magnetic base, and a ball and socket joint coupling the spacer rod, at an end thereof, to the magnetic stabilizing mass.

In another aspect, an apparatus for suppressing oscillations of an oscillating body is provided. The apparatus may include a circular magnetic base and a circular magnetic stabilizing mass. The magnetic base may be securable to the oscillating body. The magnetic stabilizing base may be pivotably coupled to the magnetic base by a pivot assembly. The magnetic stabilizing mass may be pivotable between at least a first position and a second position. The magnetic stabilizing mass may have an equilibrium position between the first position and the second position. The magnetic base may include a circular base magnet having a diameter generally equal to that of the magnetic base. The stabilizing mass may include a circular stabilizing mass magnet having a diameter generally equal to that of the magnetic stabilizing mass. Interaction between magnetic fields produced by the base magnet and the stabilizing mass magnet may (i) magnetically repel the magnetic stabilizing mass away from the first position at least when the magnetic stabilizing mass is offset from the equilibrium position toward the first position, and (ii) magnetically repel the magnetic stabilizing mass away from the second position at least when the magnetic stabilizing mass is offset from the equilibrium position toward the second position. The pivot assembly may include a spacer rod extending generally perpendicularly from the magnetic base, and a ball and socket joint coupling the spacer rod, at an end thereof, to the magnetic stabilizing mass.

DESCRIPTION OF EXAMPLE EMBODIMENTS

Figure 1:
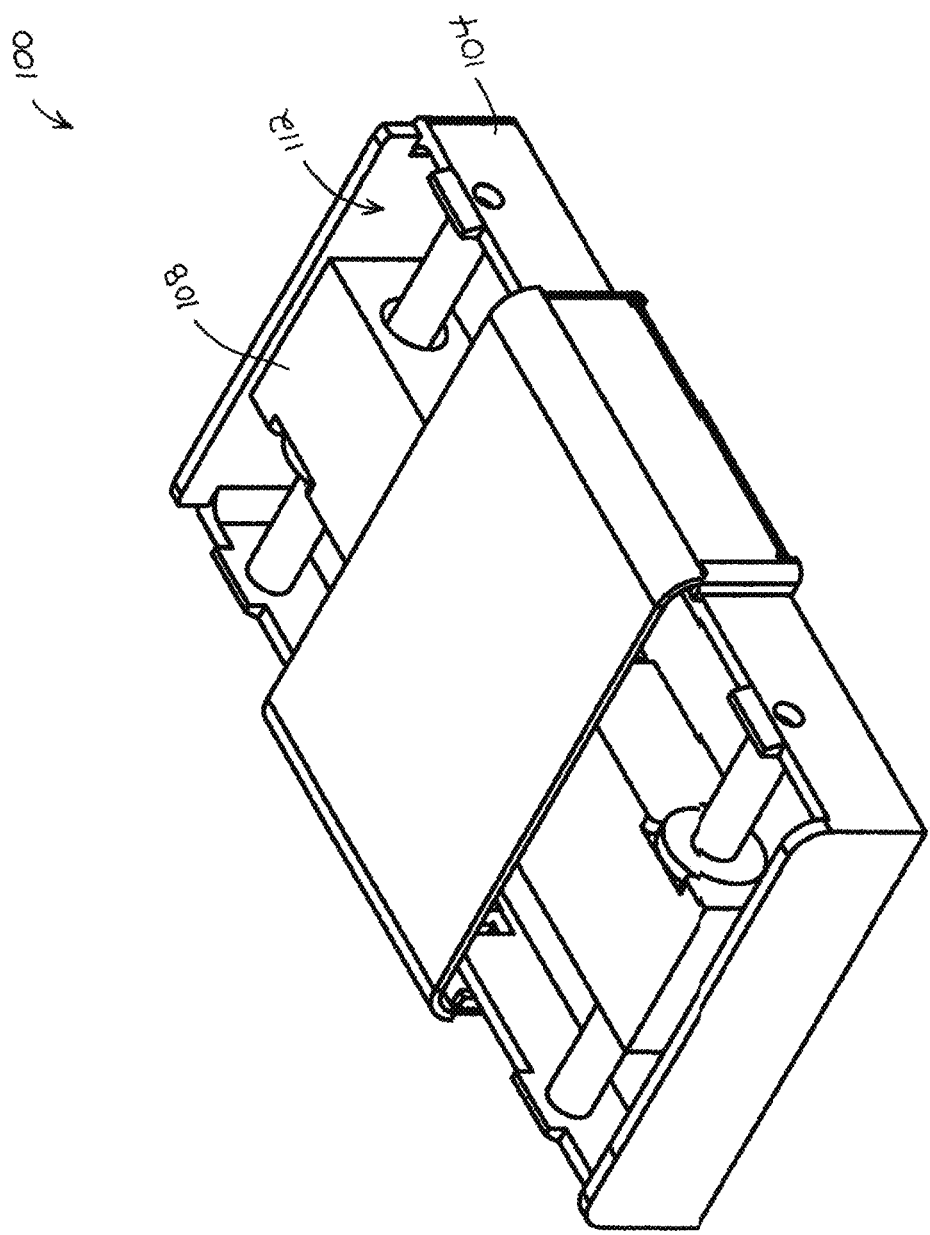
FIG. 1 is a perspective view of an apparatus for suppressing oscillation, in accordance with an embodiment.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined" or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", or "directly fastened" where the parts are connected in physical contact with each other. As used herein, two or more parts are said to be "rigidly coupled", "rigidly connected", "rigidly attached", "rigidly joined", or "rigidly fastened" where the parts are coupled so as to move as one while maintaining a constant orientation relative to each other. None of the terms "coupled", "connected", "attached", "joined", and "fastened" distinguish the manner in which two or more parts are joined together, unless specifically stated otherwise.

As used herein and in the claims, the terms "generally", "approximately", and "substantially" mean "90 to 110%", unless expressly specified otherwise.

As used herein and in the claims, a first element is said to be "received" in a second element where at least a portion of the first element is received in the second element unless specifically stated otherwise.

As used herein and in the claims, a first element is said to be "transverse" to a second element where the elements are oriented within 45 degrees of perpendicular to each other.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. 112$a$, or 112$_1$). Multiple elements herein may be identified by part numbers that share a base number in common and that differ by their suffixes (e.g. 112$_1$, 112$_2$, and 112$_3$). All elements with a common base number may be referred to collectively or generically using the base number without a suffix (e.g. 112).

Unwanted oscillations can present challenges in a wide variety of applications. For example, the oscillations of a 3D printer print head during 3D printing can reduce the accuracy of the printed object. Similarly, the oscillations of a robotic arm in a manufacturing process can create manufacturing defects. Other oscillating bodies that produce unwanted oscillations include for example, home appliances (e.g. clothing washing machines and clothing dryers), and high-rise structures (i.e. tall buildings).

Furthermore, a portion of the world's population suffers from involuntary hand or forearm oscillations such as hand or elbow tremors. Depending on severity, involuntary hand motions may impede daily activities and reduce quality of life of the persons experiencing the involuntary motions. Involuntary hand and forearms motions may involve rhythmic muscle movement resulting in hand or forearm oscillation. Involuntary hand and forearm motions may be associated with Parkinson's disease and Essential Tremor. A person suffering from involuntary forearm tremors may impart their tremor to a device they are holding. For example, if the person suffering from forearm tremors is operating a camera, their tremors may be imparted to the camera and may lead to a shaky video recording or a blurry photo capture.

Embodiments disclosed herein relate to devices that may be secured to an oscillating body (e.g. such as those noted above) for the purpose of suppressing the oscillation's amplitude, and thereby lessening the negative impacts associated with the oscillation. In some aspects, the devices may have characteristics of a "damper" in that they dampen (also referred to as suppressing) oscillation amplitude.

At a high level, dampers may be classified as either tuned or broadband mass dampers. A tuned mass damper may include a mass, viscous damping fluid, and spring, which are collectively tuned to eliminate a single oscillation frequency. In a tuned mass damper, the stabilizing mass is configured to move 90 degrees out-of-phase with the oscillating body's motion at the single oscillation frequency. To target a different oscillation frequency, the mass, damping fluid, and spring combinations require reconfiguration.

Embodiments disclosed herein relate to a device having characteristics of a broadband mass damper. In contrast with a tuned mass damper, a broadband mass damper can absorb a spectrum of unwanted oscillations of an oscillating body, which fall within a wide frequency range (i.e. multi-frequency oscillation suppression). Accordingly, broadband mass dampers may be described as having a large stabilization bandwidth.

In one aspect, tuned mass dampers may differ from broadband mass dampers by their characteristic oscillating body mass to stabilizing mass ratio (also referred to as the 'damper mass ratio'). Tuned mass dampers may have a damper mass ratio of at least 20 to 1, and broadband mass dampers typically may have lesser mass ratio of at least 5 to 1. Other damper mass ratios are possible.

A mass damper, whether tuned or broadband, may be active or passive. An active damper is one in which powered actuators are used to generate forces that attenuate the targeted oscillation. Drawbacks of activate dampers include power requirements, high cost, large size, and complexity.

A passive damper is a device that operates without a power source (e.g. operates without electrical power). Passive dampers produce reactionary forces in response to an oscillation. Advantages of passive systems may include lower cost, simplicity, and no power requirements.

Dampers may employ a configuration of springs and/or viscous damping liquid to provide spring and damping coefficients that target unwanted oscillations. However, the use of springs and damping liquid has numerous drawbacks. First, dampers containing viscous damping liquid can be very expensive, difficult to customize for a targeted object and oscillation, require regular maintenance to avoid leaks, and have a fixed damping coefficient.

Second, springs have a limited life cycle that is difficult to determine. Theoretical calculations of spring life cycles have a wide margin of error. This is because a spring's life may be impacted greatly by environment, temperature, travel, impacts, and surface treatment. Also, spring design for dampers may require significant trial and error to achieve the targeted spring coefficient for the intended application.

Embodiments disclosed herein are directed to an apparatus having characteristics of a passive broadband mass damper, and related methods. The apparatus suppresses oscillations magnetically. This may avoid the use of springs and damping liquid, and their associated drawbacks. The apparatus is passive, and thus requires no power source (e.g. no batteries, and no power connections).

At a high level, the apparatus includes a magnetic stabilizing mass located in a magnetic housing. The relative magnetism of the stabilizing mass and housing produces magnetic repelling forces that resist the stabilizing mass' movement in reaction to the connected body's oscillation. This reduces the oscillation amplitude of the connected body within an oscillation frequency bandwidth. It will be appreciated that the dynamic properties of the magnetic repelling forces differ fundamentally from spring and viscous liquid systems, which are characterized by a stiffness (i.e. spring) coefficient and a damping coefficient.

Figure 2:
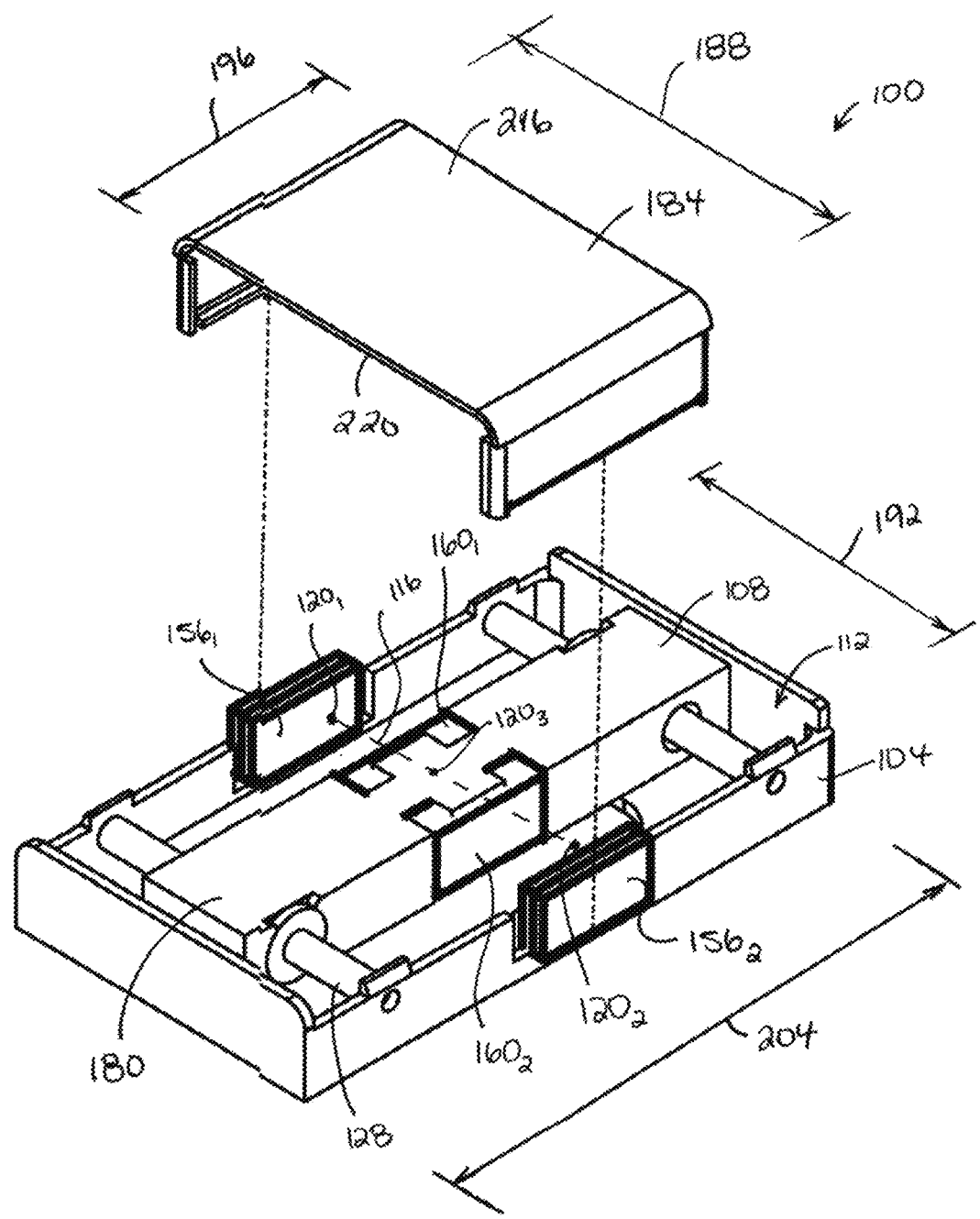
FIG. 2 is a perspective view of the apparatus of FIG. 1, with a magnetic field shield removed.
Figure 3:
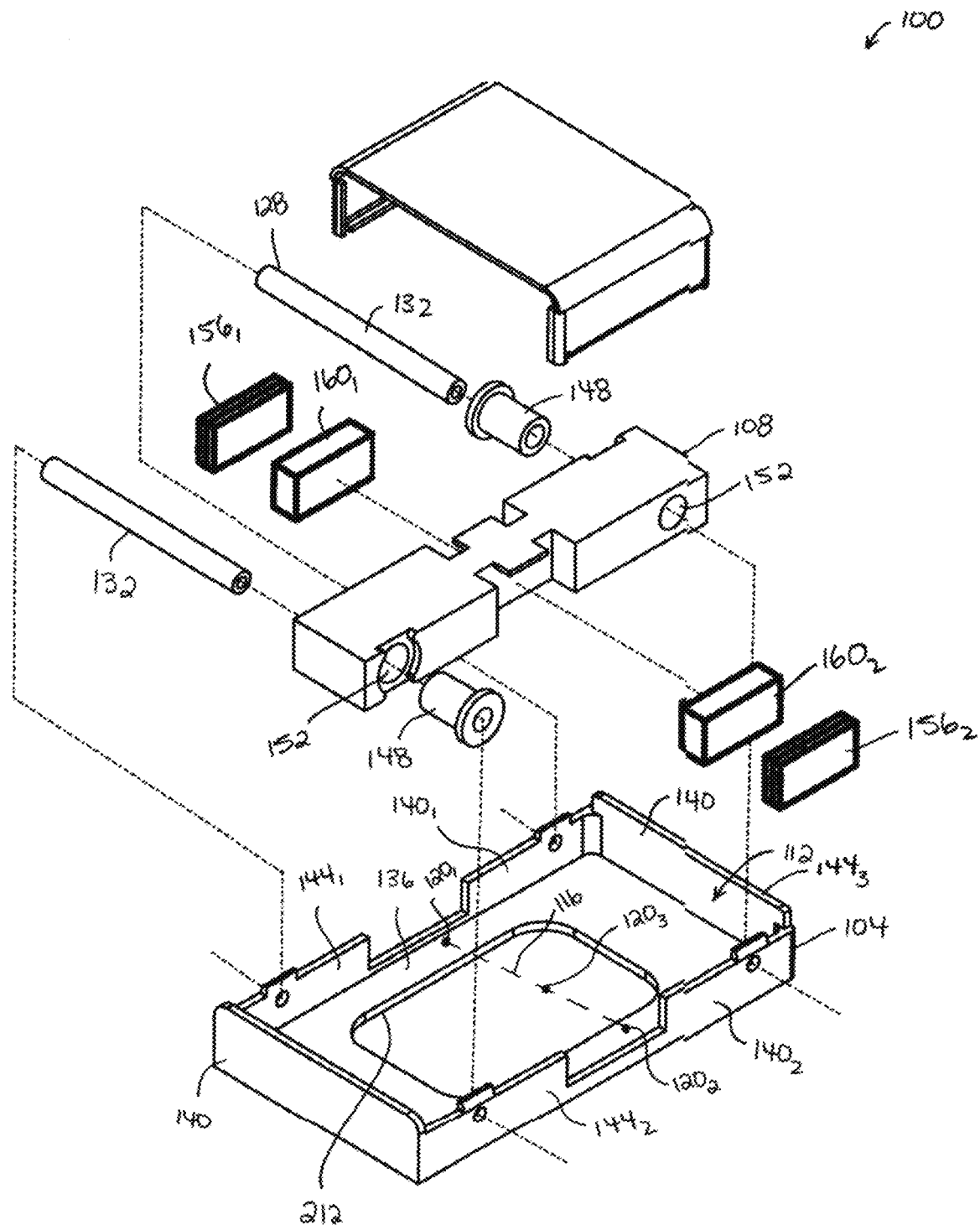
FIG. 3 is an exploded view of the apparatus of FIG. 1.
Figure 4A:
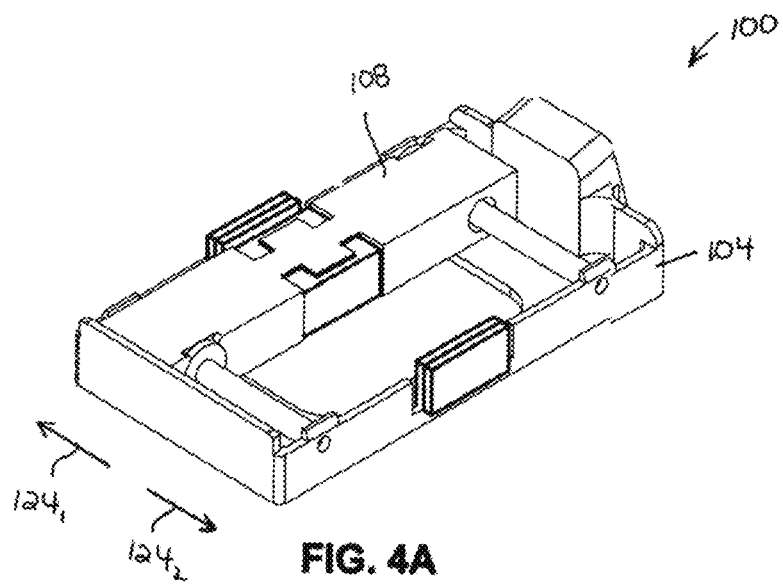
FIG. 4A is a perspective view of an apparatus for suppressing oscillations with a magnetic stabilizing mass in a first position, in accordance with another embodiment.
Figure 4B:
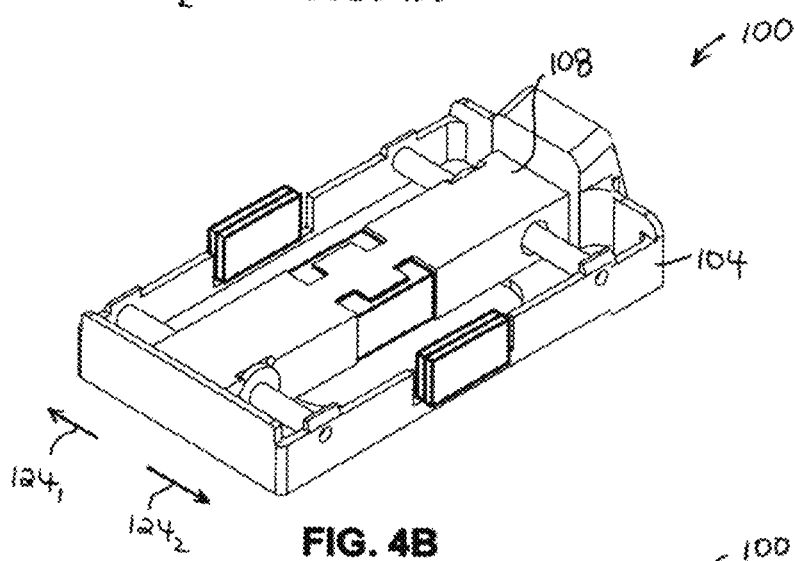
FIG. 4B is a perspective view of the apparatus of FIG. 4A with the magnetic stabilizing mass in an equilibrium position.
Figure 4C:
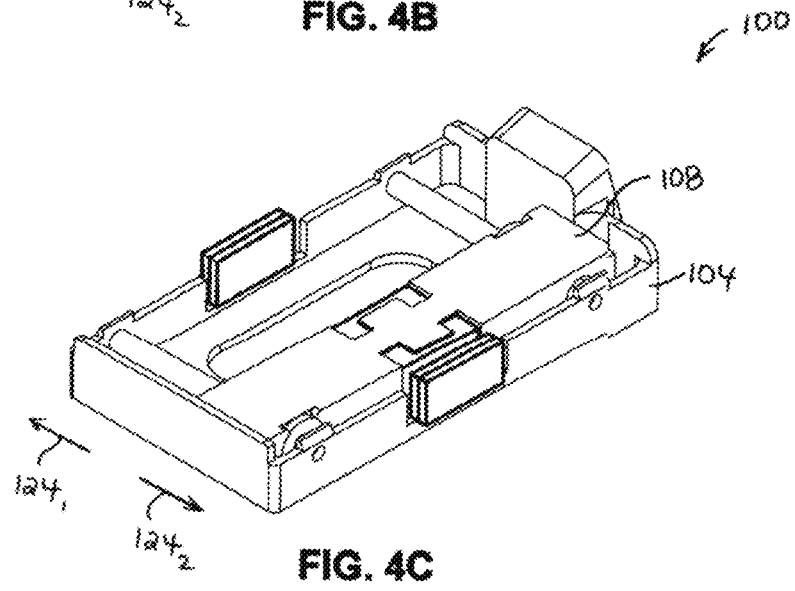
FIG. 4C is a perspective view of the apparatus of FIG. 4A with the magnetic stabilizing mass in a second position.

Referring to FIGS. 1-3, an oscillation suppression apparatus 100 is shown in accordance with an embodiment. As shown, apparatus 100 includes a magnetic housing 104 and a magnetic stabilizing mass 108. Magnetic housing 104 may be attached to a body that exhibits oscillations targeted for suppression. In the example shown, magnetic housing 104 defines an interior 112, and magnetic stabilizing mass 108 is slideably coupled to magnetic housing 104 in housing interior 112.

As used herein and in the claims, the adjective "magnetic" as used in connection with housing 104 and stabilizing mass 108, means that these elements emit a magnetic field, and are not simply attractable by magnetic fields (e.g. as in ferromagnetic materials). For example, each of magnetic housing 104 and magnetic stabilizing mass 108 includes (or is composed entirely of) one or more magnets (e.g. permanent magnets).

In use, magnetic housing 104 is rigidly attached to an oscillating body (e.g. a user's forearm) whereby the magnetic housing 104 and the oscillating body move together as one. The magnetic stabilizing mass 108 slides relative to magnetic housing 104 in reaction to oscillatory movement of the oscillating body (and the rigidly attached magnetic housing 104). This movement brings opposing magnetic fields of the magnetic stabilizing mass 108 and magnetic housing 104 into interactions which create magnetic repelling forces that are out of phase with the body's oscillation, and thereby suppresses (i.e. reduces the amplitude of) the oscillation.

As used herein and in the claims, references to "sliding" or "slideably" or "slides" mean to move smoothly, and do not imply continuous physical contact. For example, a body may slide relative to another body by smoothly gliding, rolling, hovering, or running along a rail or track.

FIGS. 4A-C and 5A-C illustrate exemplary movements of a magnetic stabilizing mass 108 that is slideably coupled to magnetic housing 104 in a manner that allows (e.g. constrains) the magnetic stabilizing mass 108 to sliding along a linear path 116, between a first position $120_1$ and a second position $120_2$. An equilibrium position $120_3$ is located between the first and second positions $120_1$ and $120_2$. A first direction $124_1$ (also referred to as a forward direction $124_1$) is defined by a vector oriented from equilibrium position $120_3$ towards first position $120_1$, and a second direction $124_2$ (also referred to as a rearward direction $124_2$) is defined by a vector oriented from equilibrium position $120_3$ towards second position $120_2$.

As shown by comparison of FIGS. 4B and 5B to FIGS. 4A and 5A, when magnetic housing 104 (rigidly connected to the oscillating body) moves in second direction $124_2$, magnetic stabilizing mass 108 effectively moves relative to magnetic housing 104 in the first direction $124_1$ towards first position $120_1$. As magnetic stabilizing mass 108 moves away from equilibrium position $120_3$ towards first position $120_1$, magnetic repulsion forces develop between magnetic stabilizing mass 108 and magnetic housing 104 which (i) urge the magnetic stabilizing mass 108 to move towards the equilibrium position $120_3$ (i.e. to move in the second direction $124_2$ relative to magnetic housing 104), and (ii) urge the magnetic housing 104 to move in the first direction $124_1$ (i.e. in opposition to the oscillation). The result is that the oscillation amplitude in the second direction $124_2$ is reduced.

Referring to FIGS. 4B and 5B, and FIGS. 4C and 5C, a corresponding opposite behavior is exhibited when the body's oscillation moves the magnetic housing 104 in the first direction $124_1$. Magnetic stabilizing mass 108 effectively moves relative to magnetic housing 104 in the second direction $124_2$ towards second position $120_2$. As magnetic stabilizing mass 108 moves away from equilibrium position $120_3$ towards second position $120_2$, magnetic repulsion forces develop between magnetic stabilizing mass 108 and magnetic housing 104 which (i) urge the magnetic stabilizing mass 108 to move towards the equilibrium position $120_3$ (i.e. to move in the first direction $124_1$ relative to magnetic housing 104), and (ii) urge the magnetic housing 104 to move in the second direction $124_2$ (i.e. in opposition to the oscillation). The result is that the oscillation amplitude in the first direction $124_1$ is reduced.

Thus, in use apparatus 100 reduces oscillation amplitudes in both directions $124_1$ and $124_2$ (i.e. suppresses the oscillation) using magnetic repulsion forces between magnetic housing 104 and magnetic stabilizing mass 108.

Returning to FIG. 2, magnetic stabilizing mass 108 may be mounted to magnetic housing 104 in magnetic housing interior 112 in any manner that allows magnetic stabilizing mass 108 to slide relative to magnetic housing 104 in response to oscillations of the connected body. In the example shown, magnetic stabilizing mass 108 is slideably coupled to magnetic housing 104 in a manner that constrains magnetic stabilizing mass 108 to movement along a straight linear path. As used herein, a "linear" path (also referred to as a 'one dimensional' path) is one composed of a singular line (e.g. having no branches), which may be straight as illustrated or curved.

As shown, magnetic stabilizing mass 108 may be mounted to magnetic housing 104 by a bearing assembly 128 that reduces frictional resistance to movement between magnetic stabilizing mass 108 and magnetic housing 104.

Bearing assembly 128 may be any device that acts to support stabilizing mass 108 within magnetic housing interior 112. In some embodiments, bearing assembly 128 may guide (e.g. constrain) magnetic stabilizing mass 108 to move along linear path 116.

Turning to FIG. 3, in some embodiments, bearing assembly 128 may include, for example one or more (or all) of tracks, guide rails, roller bearings, ball bearings, bushings, drawer slides, wheels, or similar friction mitigating mechanical devices. Preferably, bearing assembly 128 provides an effective coefficient of friction (static and dynamic) of less than 0.2 (i.e. friction force during sliding movement of magnetic stabilizing mass 108, relative to magnetic housing 104 along linear path 116, is less than 20% of the weight of the magnetic stabilizing mass 108). In some embodiments, bearing assembly 128 may suspend magnetic stabilizing mass 108 within magnetic housing 104 (i.e. out of contact with magnetic housing 104), which may further reduce friction during sliding.

By reducing friction, magnetic stabilizing mass 108 can move freely along linear path 116 in reaction to oscillatory movements of magnetic housing 104. As described above, the relative movement of magnetic stabilizing mass 108 away from equilibrium position $120_3$ is responsible for bringing the magnetic fields of magnetic housing 104 and magnetic stabilizing mass 108 into an interactive proximity that creates the repulsive forces, which oppose the oscillatory movements of the magnetic housing 104 (and connected body).

Still referring to FIG. 3, the illustrated bearing assembly 128 includes guide rails 132 that suspend magnetic stabilizing mass 108 within magnetic housing interior 112, and constrain magnetic stabilizing mass 108 to a straight linear path. As shown, magnetic housing 104 includes a base 136 (e.g. which may be mounted, in contact with or facing, an oscillating body) and sidewalls 140 that extend upward from base 136. Magnetic housing sidewalls 140 may define a magnetic housing front end $144_1$ (also referred as magnetic housing first end $144_1$) and an opposed magnetic housing rear end $144_2$ (also referred as magnetic housing second end $144_2$). For example, magnetic housing 104 may include a front sidewall $140_1$ (also referred to as first sidewall $140_1$) at magnetic housing front end $144_1$, and a rear sidewall $140_2$ (also referred to as second sidewall $140_2$) at magnetic housing rear end $144_2$. Guide rails 132 may extend between magnetic housing front and rear ends $144_1$ and $144_2$. For example, each guide rail 132 may be connected to magnetic housing front sidewall $140_1$ and to magnetic housing rear sidewall $140_2$.

Magnetic stabilizing mass 108 may be mounted to guide rails 132 in any manner that allows magnetic stabilizing mass 108 to move along guide rails 132 with little friction. For example, magnetic stabilizing mass 108 may be mounted to guide rails 132 by one or more friction mitigating members 148, which may include a bushing (e.g. Teflon sleeve or oil impregnated sleeve), roller bearing, or ball bearing. In use, magnetic stabilizing mass 108 slides along guide rails 132 between the first and second positions $120_1$ and $120_2$.

Apparatus 100 may include any number of guide rails 132. In the illustrated example, two guide rails 132 are shown. In other embodiments, there may be just one guide rail 132 (e.g. to simplify the design and reduce cost), or there may be three or more guide rails 132 (e.g. to provide greater support and stability for magnetic stabilizing mass 108). Guide rails 132 may extend through apertures 152 in magnetic stabilizing mass 108 as shown, or guide rails 132 may be located externally to magnetic stabilizing mass 108.

Guide rails 132 may be made of any material with sufficient strength and rigidity to support magnetic stabilizing mass 108 without substantial deflection. For example, guide rails 132 may be made of metal (e.g. aluminum or steel). A lightweight metal (e.g. having a density of less than 4 g/cm$^3$), such as aluminum, may provide the required strength without adding substantially to the weight of apparatus 100. A reduction in weight may reduce the burden of apparatus on the user where apparatus 100 is carried by the user (e.g. attached to their forearm, or attached to an object carried by the user).

Figure 6:
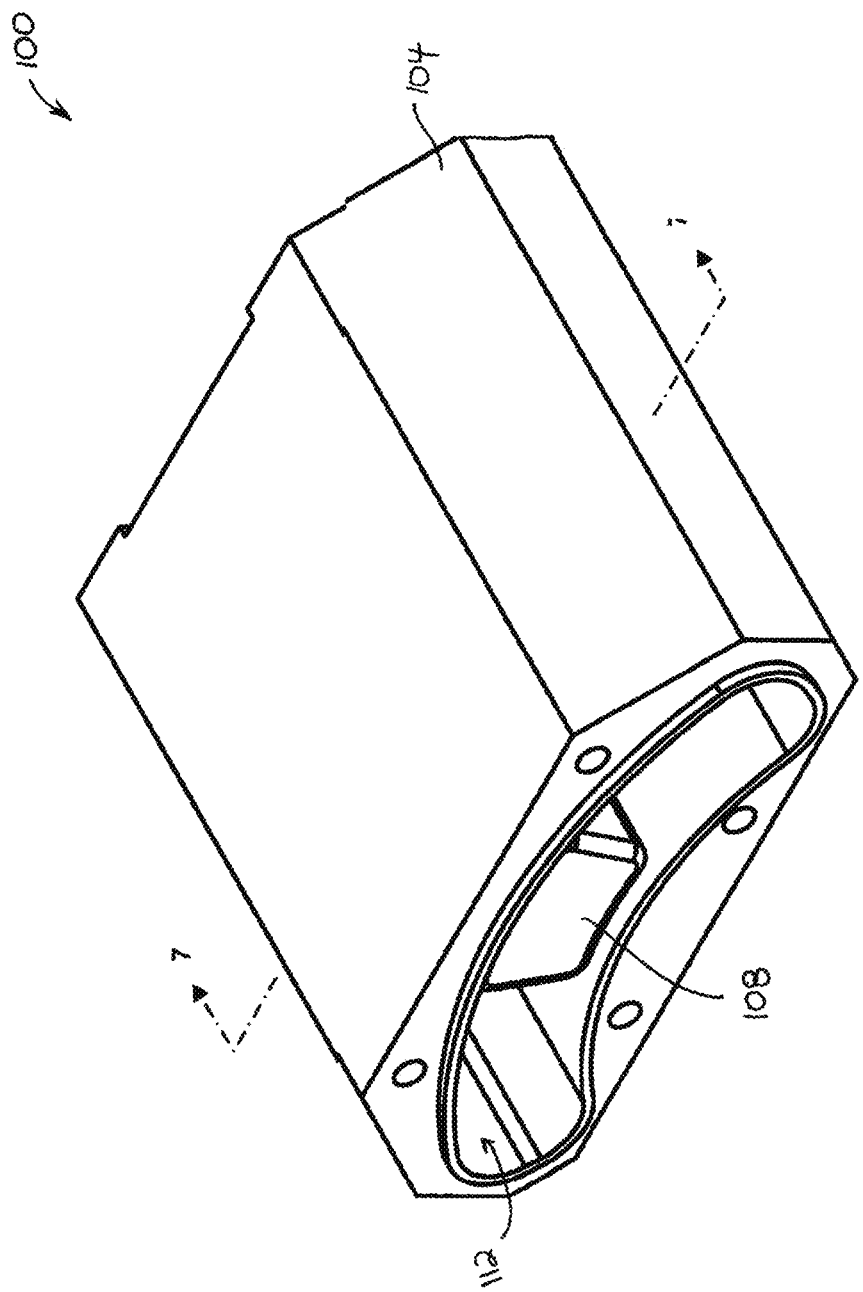
FIG. 6 is a perspective view of an apparatus for suppressing oscillations in accordance with another embodiment.
Figure 7:
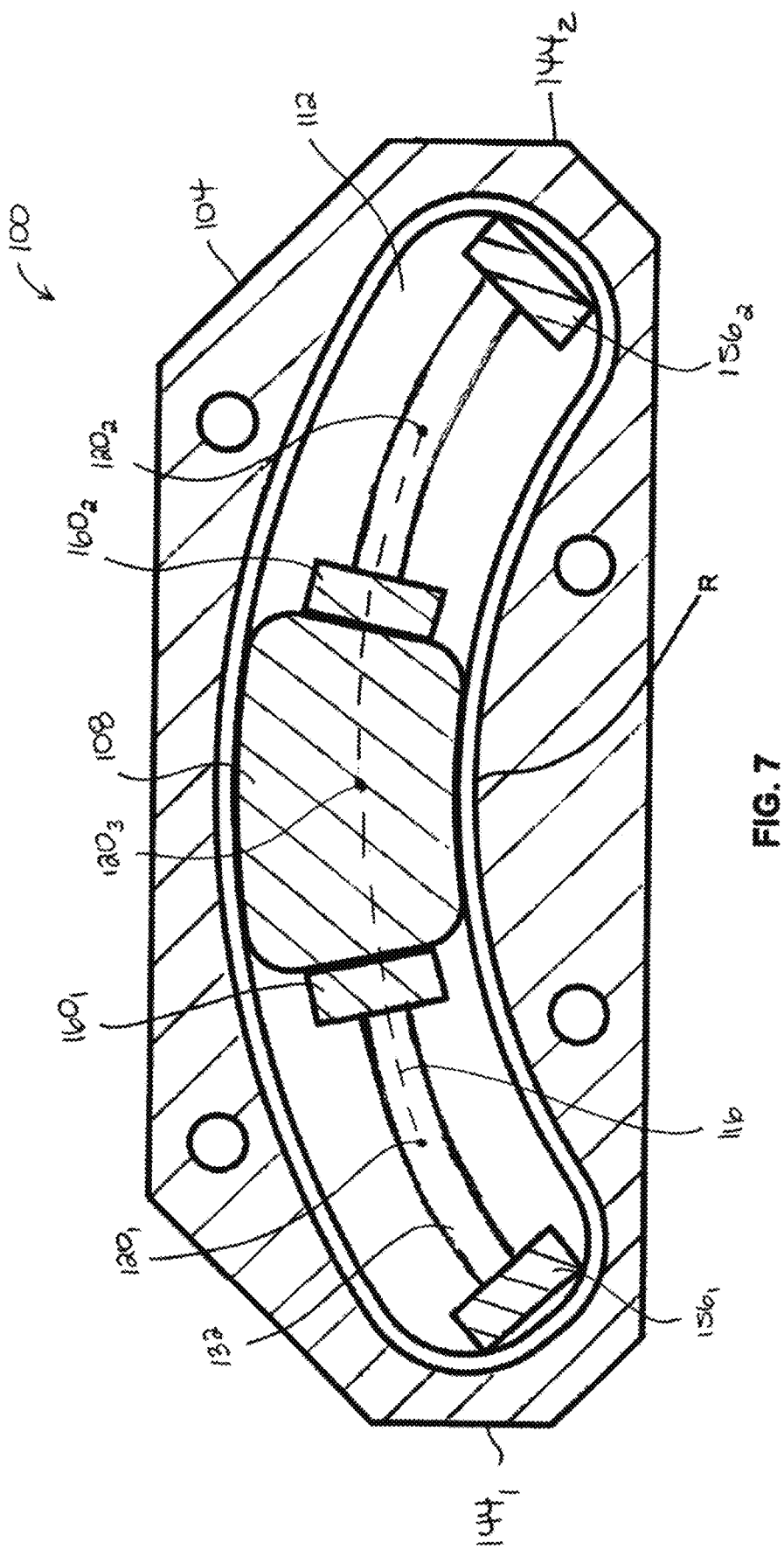
FIG. 7 is a cross-sectional view taken along line 7-7 in FIG. 6.

Reference is now made to FIGS. 6-7. In some embodiments, magnetic stabilizing mass 108 may be movable along a curved (e.g. arcuate) path within magnetic housing 104. The illustrated example shows a magnetic stabilizing mass 108 slideably coupled to magnetic housing 104 in a manner that constrains magnetic stabilizing mass 108 to a curved linear path. In general, apparatus 100 may be more effective at suppressing oscillations where the movement path of the magnetic stabilizing mass 108 more closely matches the directionality of the oscillation. Accordingly, an apparatus 100 having a curved linear movement path 116 as shown may provide greater suppression to oscillations having a similarly curved (e.g. arcuate or rotating) directionality, as compared to a straight linear movement path all else being equal.

As shown, curved linear path 116 may curve from equilibrium position $120_3$ downwardly (e.g. towards the oscillating body to which apparatus 100 is mounted) to first and second positions $120_1$ and $120_2$. A curved linear path 116 may have a radius of curvature of between 1 cm and 100 cm for example, which may be selected according to the characteristics of the oscillations targeted for suppression.

As used herein, magnetic stabilizing mass 108 is said to be "in" or "within" magnetic housing interior 112 where at least a portion (or all) of magnetic stabilizing mass 108 is inside magnetic housing interior 112. For example, a portion of magnetic stabilizing mass 108 may extend outside of magnetic housing interior 112.

Turning to FIG. 2, each of magnetic housing 104 and magnetic stabilizing mass 108 may be composed of, or include, any configuration of magnet(s) that generate repulsion forces which oppose oscillatory movements of the magnetic housing 104. For example, each of magnetic housing 104 and magnetic stabilizing mass 108 may include one or more discrete magnets. In the illustrated example, magnetic housing 104 includes first and second housing magnets $156_1$ and $156_2$ (also referred to as front and rear housing magnets $156_1$ and $156_2$), and magnetic stabilizing mass 108 includes first and second stabilizing mass magnets $160_1$ and $160_2$ (also referred to as front and rear stabilizing mass magnets $160_1$ and $160_2$). In alternative embodiments, any one or more (or all) of magnets 156 and 160 may be substituted by two or more magnets (e.g. there may be two or three front housing magnets $156_1$).

Figure 5A:
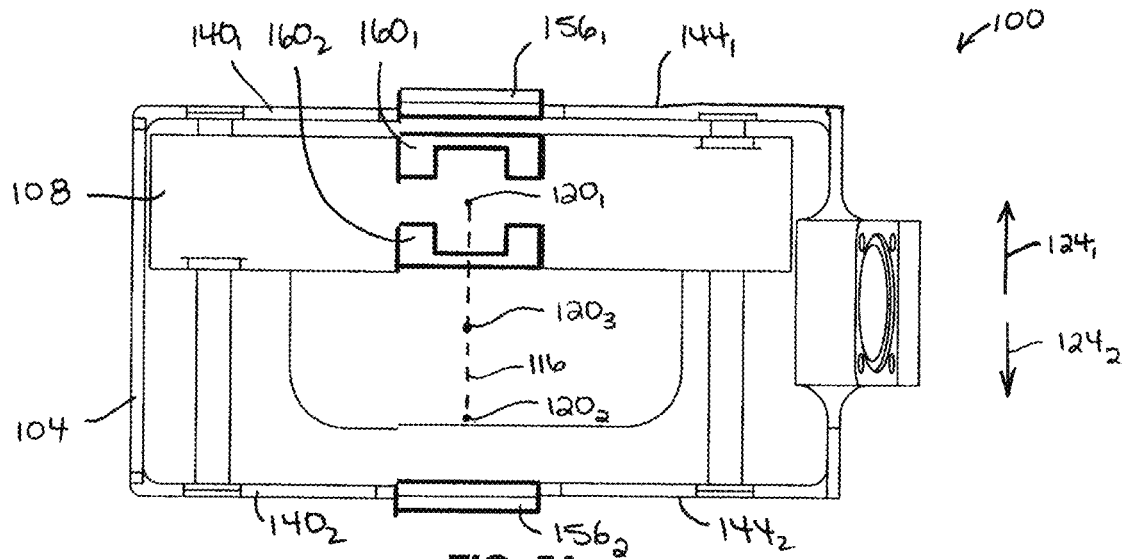
FIG. 5A is a top plan view of the apparatus of FIG. 4A with the magnetic stabilizing mass in the first position.
Figure 5B:
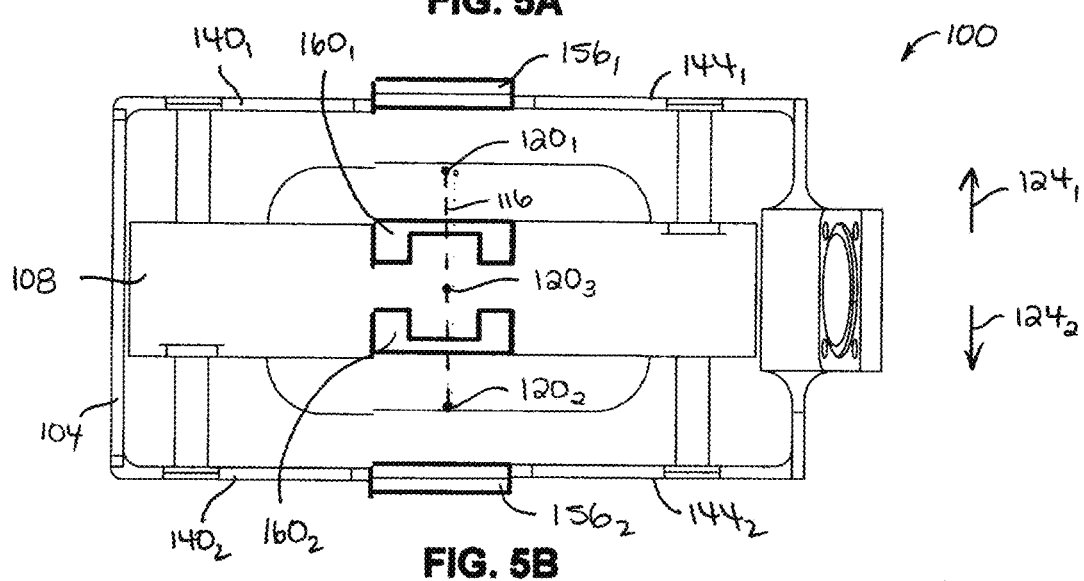
FIG. 5B is a top plan view of the apparatus of FIG. 4A with the magnetic stabilizing mass in the equilibrium position.
Figure 5C:
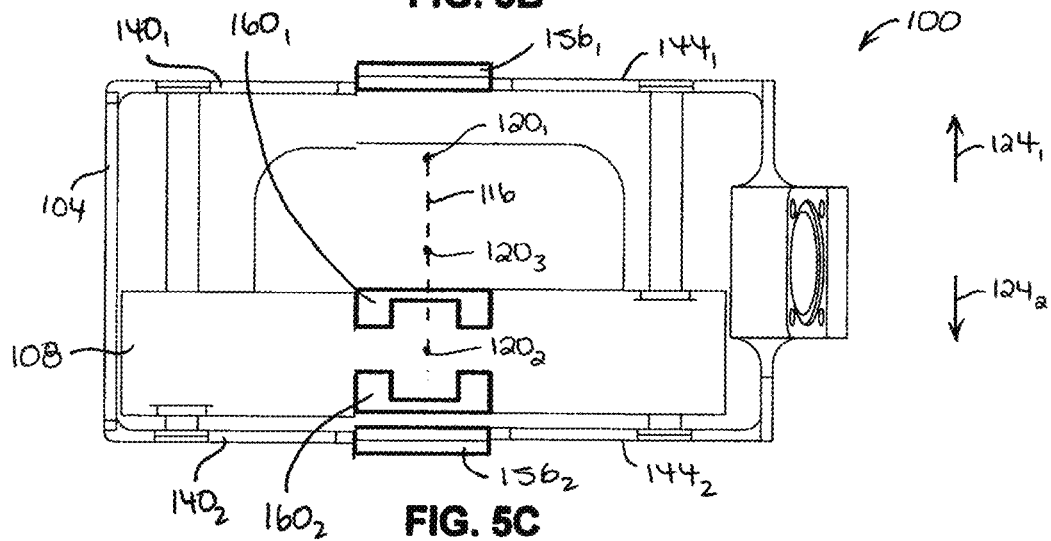
FIG. 5C is a top plan view of the apparatus of FIG. 4A with the magnetic stabilizing mass in the second position.

Referring to FIGS. 5A-5C, in the illustrated example, first magnets $156_1$ and $160_1$ are positioned and oriented to generate together a repelling force when magnetic stabilizing mass 108 is offset from equilibrium position $120_3$ towards first position $120_1$, and second magnets $156_2$ and $160_2$ are positioned and oriented to generate together a repelling force when magnetic stabilizing mass 108 is offset from equilibrium position $120_3$ towards second position $120_2$. As shown, magnets 156 and 160 are positioned so that as magnetic stabilizing mass 108 moves away from equilibrium position $120_3$ towards first position $120_1$, a distance between first magnets $156_1$ and $160_1$ decreases and a distance between second magnets $156_2$ and $160_2$ increases; and as magnetic stabilizing mass 108 moves away from equilibrium position $120_3$ towards second position $120_2$, a distance between second magnets $156_2$ and $160_2$ decreases and a distance between first magnets $156_1$ and $160_1$ increases.

A magnet's orientation may be described by reference to their North and South magnetic poles. When the same pole (e.g. both North or both South) of two magnets are brought into proximity to each other, the magnetic fields of those magnets produce a magnetic repelling force that urges the magnets to separate (as opposed to an attractive force that urges the magnet to come together). First magnets $156_1$ and $160_1$ may be oriented so that they generate a repulsive force when moved toward each other; and second magnets $156_2$ and $160_2$ may be oriented so that they generate a repulsive force when moved toward each other. For example, first housing magnet $156_1$ may be oriented with a first pole facing in the second direction $124_2$ (e.g. rearward) and first stabilizing mass magnet $160_1$ may be oriented with a first pole facing in the first direction $124_1$ (e.g. forward), and both first poles may be the same (e.g. both North or both South). Similarly, second housing magnet $156_2$ may be oriented with a first pole facing in the first direction $124_1$ (e.g. forward) and second stabilizing mass magnet $160_2$ may be oriented with a first pole facing in the second direction $124_2$ (e.g. rearward), and both first poles may be the same (e.g. both North or both South).

As shown, first housing magnet $156_1$ may be located at magnetic housing front end $144_1$ (e.g. connected to magnetic housing front sidewall $140_1$) proximate first position $120_1$, and second housing magnet $156_2$ may be located at magnetic housing rear end $144_2$ (e.g. connected to magnetic housing rear sidewall $140_2$) proximate second position $120_2$. First stabilizing mass magnet $160_1$ may be positioned at magnetic stabilizing mass front end $164_1$, and second stabilizing mass $160_2$ may be positioned at magnetic stabilizing mass rear end $164_2$, as shown. As exemplified, the housing and stabilization mass magnets 156 and 160 may be longitudinally aligned along a line parallel to path 116. Such alignment may provide a symmetry that may simplify the design. In alternative embodiments, one or more (or all) of magnets 156 and 160 may be offset from a line parallel to path 116. Such misaligned may provide flexibility to better target certain oscillations for suppression.

Figure 8:
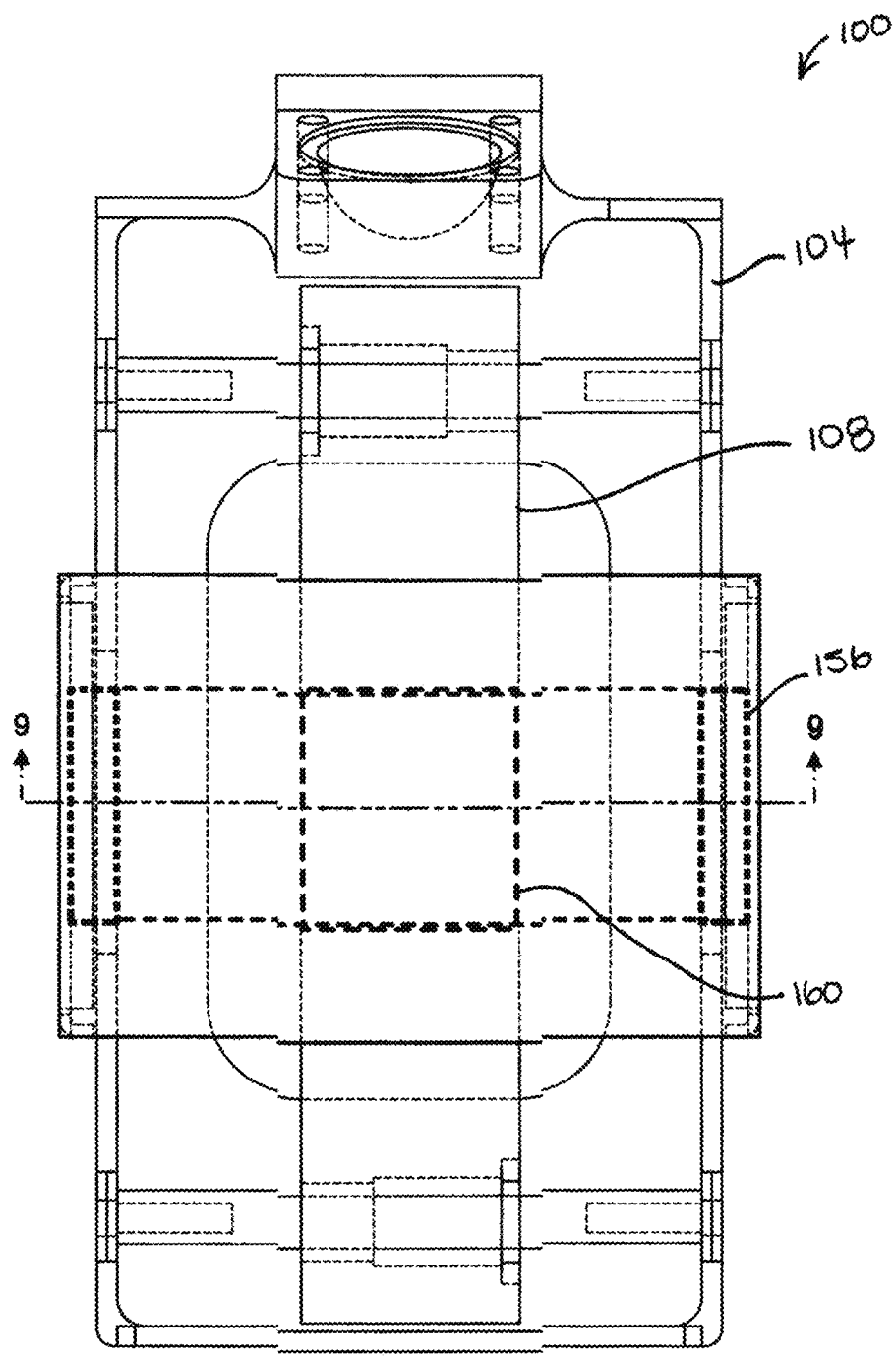
FIG. 8 is a top plan view of an apparatus for suppressing oscillations in accordance with another embodiment.
Figure 9:
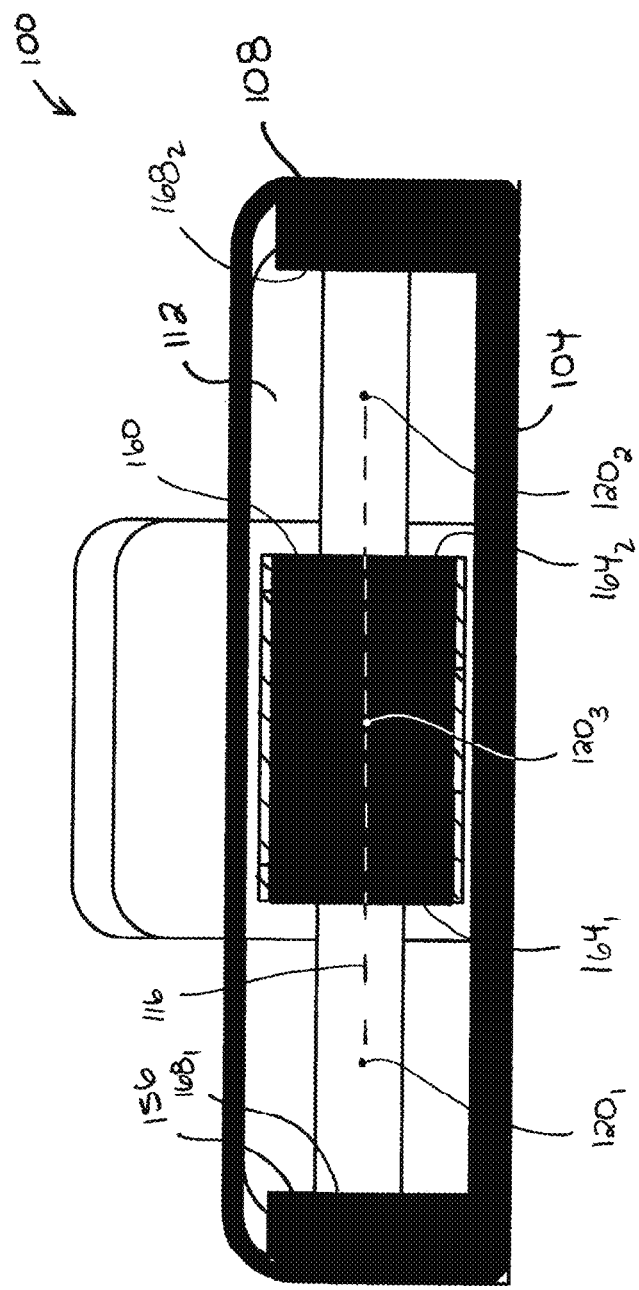
FIG. 9 is a cross-sectional view taken along line 9-9 in FIG. 8.

Reference is now made to FIGS. 8-9. In some embodiments, magnetic housing 104 may include just one housing magnet 156 (i.e. instead of two or more housing magnets 156). Alternatively or in addition, magnetic stabilizing mass 108 may include just one stabilizing mass magnet 160 (i.e. instead of two or more stabilizing mass magnets 160). The illustrated embodiment is an example of an apparatus 100 that includes just one housing magnet 156 and just one stabilizing mass magnet 160. In this example, magnets 156 and 160 may be shaped, positioned, and oriented to produce the repelling forces described above when magnetic stabilizing mass 108 is offset from equilibrium position $120_3$ towards the first and second positions $120_1$ and $120_2$. For example, a front portion $168_1$ (also referred to as a first portion $168_1$) of housing magnet 156 at magnetic housing front end $144_1$ may define a first pole, and a rear portion $168_2$ (also referred to as a second portion $168_2$) of housing magnet 156 at magnetic housing rear end $144_2$ may define a second pole. Stabilizing mass magnet 160 may have first and second poles at respective front and rear ends $164_1$ and $164_2$ of magnetic stabilizing mass 108. The first poles of magnetic housing 104 and magnetic stabilizing mass 108 may be the same (e.g. both North or both South), and the second poles of magnetic housing 104 and magnetic stabilizing mass 108 may be the same (e.g. both South or both North), whereby the repelling forces described above for suppressing oscillations may be produced.

Referring to FIG. 3, magnets 156 and 160 may be permanent magnets. As compared with electromagnets, permanent magnets do not require electrical power to emit a magnetic field, and therefore do not require apparatus 100 to include a battery or power connection. As compared with temporary magnets, permanent magnets retain their magnetic intensity nearly indefinitely (typically 10 years or more). In preferred embodiments, magnets 156 and 160 are rare earth magnets, such as for example neodymium magnets. Advantageously, rare earth magnets are characterized by a long life cycle (i.e. before an appreciable loss of magnetism), low manufacturing cost, high magnetic field strength to mass ratio, and high magnetic field strength to volume ratio.

Referring to FIGS. 5A-5C, the magnetic repelling force generated by opposing magnetic fields increases as the distance between the magnets 156 and 160 decreases. Without being limited by theory, it is approximated that the repelling force is inversely proportional to a distance between the magnets 156 and 160, squared. Consequently, magnets 156 and 160 in apparatus 100 will generate greater repelling forces in response to stronger oscillations that cause the magnetic stabilizing mass 108 to move faster and therefor further away from the equilibrium position $120_3$ towards the first and second positions $120_1$ and $120_2$.

For better vibration suppression, it is preferred that the magnetic stabilizing mass 108 be permitted to develop an initial acceleration with minimal resistance (i.e. minimal magnetic and frictional resistance). This is because apparatus 100 relies upon the movement of magnetic stabilizing mass 108 away from equilibrium position $120_3$ towards the first and second positions $120_1$ and $120_2$ in order to produce the out-of-phase repelling forces that suppress the targeted oscillations. Accordingly, when magnetic stabilizing mass 108 is located at equilibrium position $120_3$, the repelling forces between magnets 156 and 160 should be small (or even effectively zero) so that magnetic stabilizing mass 108 may accelerate substantially unencumbered.

Equilibrium position $120_3$ is the position at which magnetic stabilizing mass 108 settles when apparatus 100 is at rest (i.e. not oscillating). At equilibrium position $120_3$, forward and rearward repelling forces (if any) acting upon magnetic stabilizing mass 108 are equal. Each of the forward and rearward repelling forces acting upon magnetic stabilizing mass 108 at equilibrium position $120_3$ may be less than 5% (i.e. 0% to 5%) of the weight of magnetic stabilizing mass 108. In the illustrated example, equilibrium position $120_3$ is located at a midpoint along linear path 116 between first and second positions $120_1$ and $120_2$. In alternative embodiments, equilibrium position $120_3$ is instead located closer to one of the first or second positions 120 than the other. This may be due to the shape of linear path 116, or the relative strengths of different magnets among magnets 156 and 160. For example, in various embodiments, magnets $156_1$ and $156_2$ may have the same or different strength, and magnets $160_1$ and $160_2$ may have the same or different strength.

Returning to FIG. 2, magnetic stabilizing mass 108 may be made of any materials that can provide an overall density suitable for providing the required weight in an acceptable volume. In some embodiments, magnetic stabilizing mass 108 includes a dense metal (e.g. having a density greater than 6 g/cm$^3$), such as a tungsten alloy (e.g. 80% or more tungsten, and remainder is other metal(s) such as nickel, copper, or iron). For example, magnetic stabilizing mass 108 may be composed essentially of a dense metal body 180 carrying magnet(s) 160.

Still referring to FIG. 2, apparatus 100 may optionally include a magnetic field shield 184. Magnetic field shield 184 may help reduce the spread of magnetic fields emitted by magnetic housing 104 and magnetic stabilizing mass 108 outside of apparatus 100. This may reduce the risk that apparatus 100 may interfere with or damage electronic equipment (e.g. hard disk drives), cards with magnetic strips, pacemakers, and other articles/devices. As shown, magnetic field shield 184 may be connected to magnetic housing 104, and sized and positioned to overlay magnets 156 and 160. For example, magnetic field shield 184 may have a 'C-shape' that extends over front and rear housing ends $144_1$ and $144_2$, as well as upper end $144_3$ of magnetic housing 104.

In the illustrated embodiment, magnetic field shield 184 has a longitudinal length 188 that is equal to or greater than a length 192 of magnetic housing 104. As shown, magnetic field shield 184 has a lateral width 196 that is less than width 204 of magnetic housing 104. In other embodiments, shield width 196 may be equal to or greater than magnetic housing width 204.

Magnetic field shield 184 has a material, thickness, and surface area suitable to suppress magnetic fields from passing through magnetic field shield 184. For example, the magnetic field strength (e.g. measured in Gauss units) measured at an outer side 216 of magnetic field shield 184 may be 0% to 5% of the magnetic field strength measured at an opposed inner side 220 of magnetic field shield 184. In some embodiments, magnetic field shield 184 is composed primarily of a nickel-iron, low-expansion allow containing 36% nickel (also known as Invar 36, FeNi36, or 64FeNi).

In the illustrated example, magnetic field shield 184 is removably connected to magnetic housing 104 (i.e. magnetic field shield 184 can be selectively attached, removed, and reattached). This allows magnetic field shield 184 to be removed when not required, or to access magnetic stabilizing mass 108, bearing assembly 128, or magnets 156 or 160.

In other embodiments, apparatus 100 does not include a magnetic field shield.

Referring to FIG. 3, magnetic housing 104 may have an "open-air" housing interior 112 (i.e. housing interior 112 is open to the exterior environment). That is, magnetic housing 104 may not seal housing interior 112 (i.e. a gas or liquid tight seal is not provided). In the illustrated example, magnetic housing 104 includes an open upper end $144_3$, and a large aperture 212 in magnetic housing base 136. In one aspect, this avoids the cost and complexity of forming and maintaining a sealed housing interior 112. In another aspect, this allows for a minimalist magnetic housing 104 with reduced weight and cost. Still, for certain applications (e.g. dirty industrial applications, underwater applications), magnetic housing 104 may provide a magnetic housing interior 112 that is gas and/or liquid tight, such as to prevent an ingress of dirt or liquid that could interfere with the movement of magnetic stabilizing mass 108.

Figure 10A:
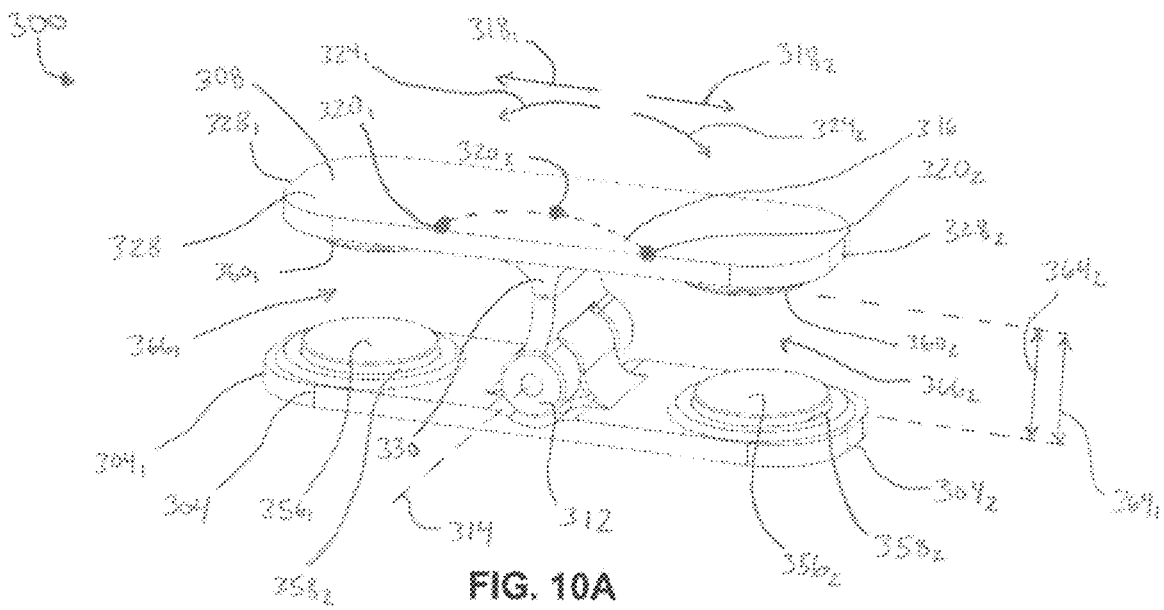
FIG. 10A is a perspective view of an apparatus for suppressing oscillations with a magnetic stabilizing mass in an equilibrium position, in accordance with another embodiment.

Reference is now made to FIGS. 10A-120 to illustrate a variety of alternative oscillation apparatuses to those described above with reference to FIGS. 1-9 At a high level, these oscillation apparatus include a magnetic stabilizing mass pivotably coupled to a magnetic base by a pivot assembly. The pivot assembly defines a pivot axis about which the magnetic stabilizing mass can pivot relative to the magnetic base in reaction to an oscillation of an oscillation body. The relative magnetism of the stabilizing mass and base produce magnetic repulsion forces as the magnetic stabilizing mass pivots about the pivot axis relative to the magnetic base. These magnetic repulsion forces produce restoring moments (also referred to as restoring torques) about the pivot axis that act to counter the stabilizing mass' movement in reaction to the connected body's oscillation. This reduces the oscillation amplitude of the connected body within an oscillation frequency bandwidth.

Figure 10B:
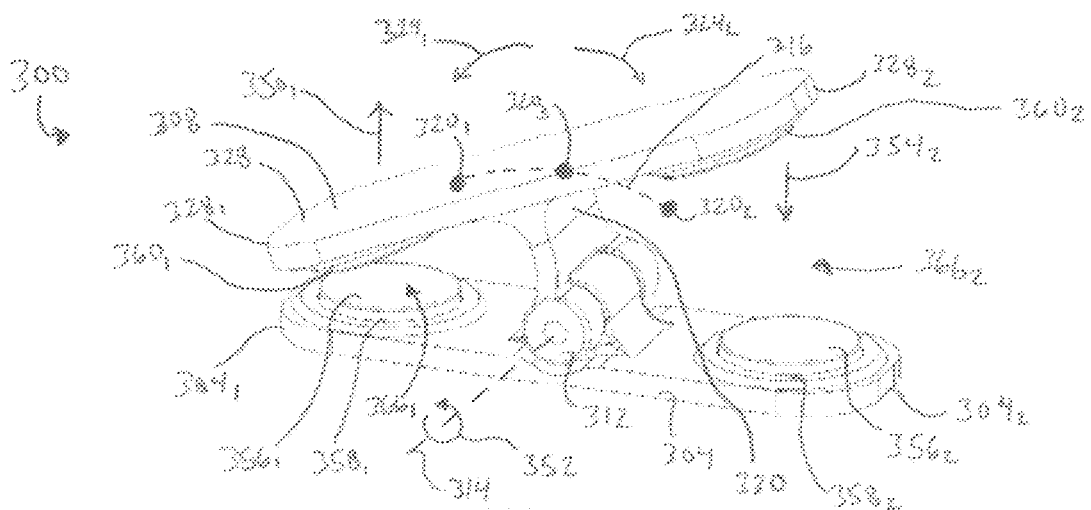
FIG. 10B is a perspective view of the apparatus of FIG. 10A with the magnetic stabilizing mass in a first position.
Figure 10C:
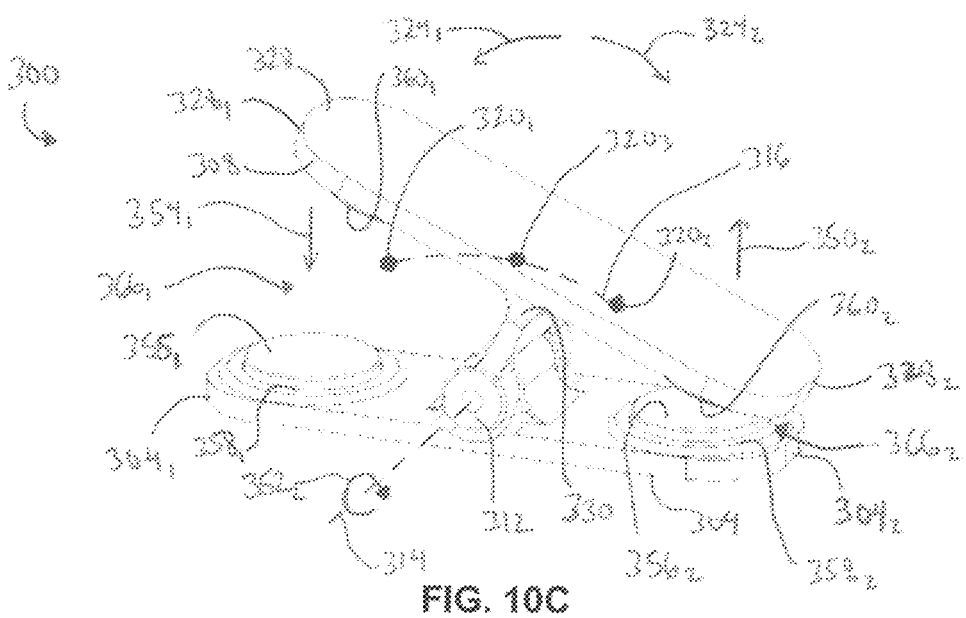
FIG. 10C is a perspective view of the apparatus of FIG. 10A with the magnetic stabilizing mass in a second position.

Referring to FIGS. 10A-10C, an oscillation apparatus 300 is shown in accordance with an embodiment. As shown, apparatus 300 includes a magnetic base 304 and a magnetic stabilizing mass 308. Magnetic base 304 may be attached to a body that exhibits oscillations targeted for suppression. Magnetic stabilizing mass 308 is coupled to magnetic base 304 by a pivot assembly 312. The pivot assembly 312 may by any device that allows magnetic stabilizing mass 308 to pivot relative to magnetic base 304 in response to oscillations of the oscillating body. A pivot assembly 312 may be selected to reduce frictional resistance to pivoting of the magnetic stabilizing mass 308 relative to the magnetic base 304. In the example shown, the pivot assembly 312 constrains magnetic stabilizing mass 308 to movement along a curved linear path 316. Preferably, pivot assembly 312 provides an effective coefficient of friction (static and dynamic) of less than 0.2 (i.e. friction force during pivoting of magnetic stabilizing mass 308, relative to magnetic base 304 along curved linear path 316, is less than 20% of the weight of the magnetic stabilizing mass 308). As used herein, a "curved linear" path is one composed of a singular line (e.g. having no branches).

In the example shown, pivot assembly 312 is a pin hinge 312. The pin hinge 312 defines a pivot axis 314 about which the magnetic stabilizing mass 308 can pivot relative the magnetic base 304 in response to oscillations of the oscillating body. In alternative embodiments, the pivot assembly may include one or more permanently lubricated self-aligning bearings in place of pin hinge 312. The use of permanently lubricated self-aligning may reduce, or even eliminate, maintenance since periodic lubrication may not be required.

As used herein and in the claims, the adjective "magnetic" as used in connection with base 304 and stabilizing mass 308, means that these elements emit a magnetic field, and are not simply attractable by magnetic fields (e.g. as in ferromagnetic materials). For example, each of magnetic base 304 and magnetic stabilizing mass 308 includes (or is composed entirely of) one or more magnets (e.g. permanent magnets or polymagnets).

In use, magnetic base 304 is rigidly attached to an oscillating body (e.g. a user's forearm) whereby magnetic base 304 and the oscillating body move together as one. Magnetic stabilizing mass 308 pivots relative to magnetic base 304 in reaction to oscillatory movement of the oscillating body (and the rigidly attached magnetic base 304). This movement brings opposing magnetic fields of magnetic stabilizing mass 308 and magnetic base 304 into interactions which create magnetic repulsion forces that are out of phase with the body's oscillation, thereby suppressing (i.e. reducing the amplitude of) the oscillation.

FIGS. 10A-10C illustrate exemplary movements of a magnetic stabilizing mass 308 that is pivotably coupled to magnetic base 304 by the pin hinge 312. As described above, pin hinge 312 allows (e.g. constrains) magnetic stabilizing mass 308 to move (i.e. pivot) along curved linear path 316, between a first position $320_1$ and a second position $320_2$. An equilibrium position $320_3$ is located between the first and second positions $320_1$ and $320_3$. A first direction $324_1$ (also referred to as a forward direction $324_1$) is defined by a curve oriented from equilibrium position $320_3$ towards first position $320_1$. A second direction $324_2$ (also referred to as a rearward direction $324_2$) is defined by a curve oriented from equilibrium position $320_3$ towards second position $320_2$.

As shown by comparison of FIG. 10A to FIG. 10B, when magnetic base 304 (rigidly connected to the oscillating body) moves in the second direction $324_2$, magnetic stabilizing mass 308 effectively pivots relative to magnetic base 304 in the first direction $324_1$ towards first position $320_1$. As magnetic stabilizing mass 308 pivots away from equilibrium position $320_3$ towards first position $320_1$, a first magnetic repulsion force $350_1$ develop between magnetic stabilizing mass 308 and magnetic base 304 which urge the magnetic stabilizing mass 308 to pivot towards the equilibrium position $320_3$ (i.e. to pivot in the second direction $324_2$ relative to magnetic base 304). First magnetic repulsion force $350_1$ produces a first restoring moment $352_1$ (also referred to as a first restoring torque) about the pivot axis 314 that urges the magnetic base 304 to move in the first direction $324_1$ (i.e. in opposition to the oscillation). The result is that the oscillation amplitude in the second direction $324_2$ is reduced.

Referring to FIG. 10A and FIG. 10C, a corresponding opposite behavior is exhibited when the body's oscillation moves the magnetic base 304 in the first direction $324_1$. Magnetic stabilizing mass 308 effectively pivots relative to magnetic base 304 in the second direction $324_2$ towards second position $320_2$. As magnetic stabilizing mass 308 pivots away from equilibrium position $320_3$ towards second position $320_2$, a second magnetic repulsion force $350_2$ develop between magnetic stabilizing mass 308 and magnetic base 304 which urge magnetic stabilizing mass 308 to pivot towards the equilibrium position $320_3$ (i.e. to pivot in the first direction $324_1$ relative to magnetic base 304). Second magnetic repulsion force $350_2$ produces a second restoring moment $352_2$ (also referred to as a second restoring torque) about the pivot axis 314 that urges the magnetic base 304 to move in the second direction $324_2$ (i.e. in opposition to the oscillation). The result is that the oscillation amplitude in the second direction $324_2$ is reduced.

Thus, in use apparatus 300 reduces amplitudes of oscillations in both forward and rearward directions $324_1$ and $324_2$ (i.e. suppresses the oscillation) using magnetic repulsion forces between magnetic base 304 and magnetic stabilizing mass 308. Apparatus 300 may similarly reduce amplitudes of oscillations that move in a generally straight linear path, e.g. straight linear path 318. In general, apparatus 300 may be more effective at suppressing oscillations where the movement path of the magnetic stabilizing mass 308 more closely matches the directionality of the oscillation. Accordingly, an apparatus 300 having a curved linear path 116, as shown, may provide greater suppression to oscillations having a similarly curved (e.g. arcuate or rotating) directionality, as compared to a generally straight linear path when all else is equal.

In some embodiments, two or more apparatuses 300 may be stacked or positioned adjacent each other, and oriented differently, to target oscillations in multiple directions. For example, two apparatus 300 may be secured to the oscillating body so that they are oriented perpendicularly to one other.

By reducing friction, e.g. as described above, magnetic stabilizing mass 308 can move freely along curved linear path 316 in reaction to oscillatory movements of magnetic base 304. As described above, pivoting of magnetic stabilizing mass 308 away from equilibrium position $320_3$ is responsible for bringing the magnetic fields of magnetic base 304 and magnetic stabilizing mass 308 into an interactive proximity that produce restoring torques, which oppose the oscillatory movements of magnetic base 304 (and connected oscillating body). A curved linear path 316 may have a radius of curvature of between 1 cm and 100 cm for example, which may be selected according to the characteristics of the oscillations targeted for suppression.

Still referring to FIGS. 10A-10C, magnetic stabilizing mass 308 includes a stabilizing mass body 328 and a stabilizing mass spacer 330 that extends generally perpendicularly from stabilizing mass body 328. Stabilizing mass spacer 330 couples stabilizing mass body 328 to pivot assembly 312. As shown, stabilizing mass spacer 330 spaces stabilizing mass body 328 apart from magnetic base 304. For example, the radius of curvature of curved linear path 316 may be adjusted by increasing or decreasing the distance that stabilizing mass spacer 330 extends from the stabilizing mass body 328. Stabilizing mass body 328 has a first stabilizing mass body end $328_1$ and a second stabilizing mass body end $328_2$ opposite the first stabilizing mass body end $328_1$.

In the example shown, stabilizing mass spacer 330 is located at a midpoint (i.e. centered) between first stabilizing mass body end $328_1$ and second stabilizing mass body end $328_2$. In this way, magnetic stabilizing mass 308 may be characterized as "T" shaped. In alternative embodiments (not shown), the stabilizing mass spacer 330 may be offset from the center of the stabilizing mass body 328 (i.e. toward first stabilizing mass body end $328_1$ or toward second stabilizing mass body end $328_2$, e.g. to target irregular and/or specific oscillations.

Similarly, magnetic base 304 has a first base end $304_1$ and a second base end $304_2$ opposite the first base end $304_1$. As shown, pivot assembly 312 is coupled to the magnetic base 304 a midpoint (i.e. centered) between the first base end $304_1$ and the second base end $304_2$. In alternative embodiments (not shown), the pivot assembly 312 may be offset from the center of the magnetic base 304 (i.e. toward first base end $304_1$ or toward second base end $304_2$, e.g. to target irregular and/or specific oscillations.

When the magnetic stabilizing mass 308 is in the first position $320_1$, e.g. as shown in FIG. 10B, first stabilizing mass body end $328_1$ is proximate to first base end $304_1$. Conversely, when the magnetic stabilizing mass 308 in the second position $320_2$, e.g. as shown in FIG. 10C, second stabilizing mass body end $328_2$ is proximate to second base end $304_2$.

Each of magnetic base 304 and magnetic stabilizing mass 308 may be composed of, or include, any configuration of magnet(s) that generate repulsion forces when their respective magnetic fields are brought into interaction. For example, each of magnetic base 304 and magnetic stabilizing mass 308 may include one or more discrete magnets.

In the example shown, magnetic base 304 includes first and second base magnets $356_1$ and $356_2$ (also referred to as front and rear base magnets $356_1$ and $356_2$). As shown, first base magnet $356_1$ may be located at first base end $304_1$ proximate first position $320_1$, and second base magnet $356_2$ may be located at second base end $304_2$ proximate second position $320_2$.

Magnets 356 may be connected to magnetic base 304 in a number of suitable way, e.g. with mechanical fasteners, adhesive, or a combination thereof. In some embodiments, magnets 356 may be removably connected to magnetic base 304 in order to facilitate maintenance and/or modification. In the example shown, magnetic base 304 includes a first base magnet recess $358_1$ to receive first base magnet $356_1$, and a second base magnet recess $358_2$ to receive second base magnet $356_2$. For example, first base magnet $356_1$ may be press or snap fit with first base magnet recess $358_1$, and second base magnet $356_2$ may be press or snap fit with second base magnet recess $358_2$. Alternatively, or in addition, an adhesive may be added to base magnet recesses $358_1$ and $358_2$ to respectively retain first and second base magnets $356_1$ and $356_2$ therein.

In the example shown, magnetic stabilizing mass 308 includes first and second stabilizing mass magnets $360_1$ and $360_2$ (also referred to as front and rear stabilizing mass magnets $360_1$ and $360_2$). As shown, first stabilizing mass magnet $360_1$ may be located at first stabilizing mass body end $328_1$, and second stabilizing mass magnet $360_2$ may be located at second stabilizing mass body end $328_2$.

Magnets 360 may be connected to stabilizing mass body 328 in a number of suitable way, e.g. with mechanical fasteners, adhesive, or a combination thereof. In some embodiments, magnets 360 may be removably connected to stabilizing mass body 328 in order to facilitate maintenance and/or customization. In the example shown, stabilizing mass body 328 includes a first stabilizing mass magnet recess to receive first stabilizing mass magnet $360_1$ and a second stabilizing mass magnet recess to receive second stabilizing mass magnet $360_2$. First and second stabilizing mass body recesses are hidden from view in FIGS. 10A-10C, but are similar to first and second base magnet recesses $358_1$ and $358_2$. For example, first stabilizing mass magnet $360_1$ may be press or snap fit with the first stabilizing mass magnet recess, and second stabilizing mass magnet $360_2$ may be press or snap fit with the second stabilizing mass magnet recess. Alternatively, or in addition, an adhesive may be added to the stabilizing mass magnet recesses to respectively retain first and second stabilizing mass magnets $360_1$ and $360_2$ therein.

As exemplified in FIG. 10A, first base magnet $356_1$ and first stabilization mass magnet $360_1$ may be axially aligned, and second base magnet $356_2$ and second stabilization mass magnet $360_2$ may be axially aligned. Such alignment may provide a symmetry that may simplify the design. In alternative embodiments, first and second base magnets $356_1$ and $356_2$ may be offset relative to corresponding first and second stabilizing mass magnets $360_1$ and $360_2$. Such a misalignment may provide flexibility to better target certain oscillations for suppression.

In alternative embodiments, any one or more (or all) of magnets 356 and 360 may be substituted by two or more magnets (e.g. there may be two or three front base magnets $356_1$). In other alternative embodiments, magnetic base 304 may include just one base magnet 156 (i.e. instead of two or more base magnets 356). Alternatively, or in addition, magnetic stabilizing mass 308 may include just one stabilizing mass magnet 360 (i.e. instead of two or more stabilizing mass magnets 360).

As shown in FIG. 10B, first base magnet $356_1$ and first stabilizing mass magnet $360_1$ are positioned and oriented to generate together a first magnetic repulsion force $350_1$ when magnetic stabilizing mass 308 is offset from equilibrium position $320_3$ towards first position $320_1$. As described above, first magnetic repulsion force $350_1$ produces a first restoring moment $352_1$ about the pivot axis 314 that urges the magnetic base 304 to move in the first direction $324_1$ (i.e.

in opposition to the oscillation). The result is that the oscillation amplitude in the second direction $324_2$ is reduced.

Similarly, as shown in FIG. 100, second base magnet $356_2$ and second stabilizing mass magnet $360_2$ are positioned and oriented to generate together a second magnetic repulsion force $350_2$ when magnetic stabilizing mass 308 is offset from equilibrium position $320_3$ towards second position $320_2$. As described above, second magnetic repulsion force $350_1$ produces a second restoring moment $352_2$ about the pivot axis 314 that urges the magnetic base 304 to move in the second direction $324_2$ (i.e. in opposition to the oscillation). The result is that the oscillation amplitude in the first direction $324_1$ is reduced.

As shown, magnets 356 and 360 are positioned so that as magnetic stabilizing mass 308 pivots away from equilibrium position $320_3$ towards first position $320_1$, a distance (also referred to as an offset) between first base magnet $356_1$ and first stabilizing mass magnet $360_1$ decreases while a distance between second base magnet $356_2$ and second stabilizing mass magnet $360_2$ increases. Conversely, as magnetic stabilizing mass 308 pivots away from equilibrium position $320_3$ towards second position $320_2$, a distance between second base magnet $356_2$ and second stabilizing mass magnet $360_2$ decreases while a distance between first base magnet $356_1$ and second stabilizing mass magnet $360_1$ increases.

A magnet's orientation may be described by reference to their North and South magnetic poles. When the same pole (e.g. both North or both South) of two magnets are brought into proximity to each other, the magnetic fields of those magnets produce a magnetic repulsion force that urges the magnets to separate (as opposed to an attractive force that urges the magnet to come together). First base magnet $356_1$ and first stabilizing mass magnet $360_1$ may be oriented so that they generate a repulsion force when moved toward each other. Likewise, second base magnet $356_2$ and second stabilizing mass magnet $360_2$ may be oriented so that they generate a repulsion force when moved toward each other. For example, first base magnet $356_1$ and first stabilizing mass magnet $360_1$ may have the same pole (e.g. both North) and be oriented to produce magnetic fields that extend generally toward each other. Similarly, second base magnet $356_2$ and first stabilizing mass magnet $360_2$ may have the same pole (e.g. both South) and be oriented to produce magnetic fields that extend generally toward each other.

Magnets 356 and 360 may be permanent magnets. As compared with electromagnets, permanent magnets do not require electrical power to emit a magnetic field, and therefore do not require apparatus 300 to include a battery or power connection. As compared with temporary magnets, permanent magnets retain their magnetic intensity nearly indefinitely (typically 10 years or more). In some embodiments, magnets 356 and 360 are rare earth magnets, such as for example neodymium magnets. Advantageously, rare earth magnets are characterized by a long life cycle (i.e. before an appreciable loss of magnetism), low manufacturing cost, high magnetic field strength to mass ratio, and high magnetic field strength to volume ratio.

With continued reference to FIGS. 10A-10C, the magnetic repulsion force generated by opposing magnetic fields increases as the distance between magnets 356 and 360 decreases. Without being limited by theory, it is approximated that the repelling force is inversely proportional to a distance between magnets 356 and 360, squared. Consequently, magnets 356 and 360 in apparatus 300 will generate greater magnetic repulsion forces (and thereby greater restoring torques) in response to stronger oscillations that cause the magnetic stabilizing mass 308 to pivot faster and, as a result, further away from equilibrium position $320_3$ towards first and second positions $320_1$ and $320_2$.

Referring to FIG. 10A, equilibrium position $320_3$ is the position at which magnetic stabilizing mass 308 settles when apparatus 300 is at rest (i.e. not oscillating). At equilibrium position $320_3$, first and second magnetic repulsion forces $350_1$ and $350_2$ (if any) acting upon magnetic stabilizing mass 308 are equal. Each of the first and second magnetic repulsion forces acting upon magnetic stabilizing mass 308 at equilibrium position $320_3$ may be less than 5% (i.e. 0% to 5%) of the weight of magnetic stabilizing mass 308. In the example shown, equilibrium position $320_3$ is located at a midpoint along curved linear path 316 between first and second positions $320_1$ and $320_2$. Further, in the example shown, when the magnetic stabilizing mass 308 is in the equilibrium position, a distance $364_1$ between first base magnet $356_1$ and first stabilizing mass magnet $360_1$ is generally equal to a distance $364_2$ between second base magnet $356_2$ and second stabilizing mass magnet $360_2$.

In alternative embodiments, equilibrium position $320_3$ is instead located closer to one of the first or second positions 320 than the other. This may be due to the shape of curved linear path 316, or the relative strengths of different magnets among magnets 356 and 360. For example, in various embodiments, first and second base magnets $356_1$ and $356_2$ may have the same or different strength, and first and second stabilizing mass magnets $360_1$ and $360_2$ may have the same or different strength.

Still referring to FIGS. 10A-10C, magnetic stabilizing mass 308 may be made of any materials that can provide an overall density suitable for providing the required weight in an acceptable volume. In some embodiments, magnetic stabilizing mass 308 includes a dense metal (e.g. having a density greater than 6 g/cm$^3$), such as a tungsten alloy (e.g. 80% or more tungsten, and remainder is other metal(s) such as nickel, copper, or iron).

In the example shown, magnetic stabilizing base 308 does not include a supplement mass attached thereto. However, in alternative embodiments, apparatus 300 may further include at least one supplemental mass coupled to magnetic stabilizing mass 308 to magnify at least one of the first and second magnetic repulsion forces $350_1$ and $350_2$. Preferably, a pair of supplemental masses are provided, e.g. one at first stabilizing mass body end $328_1$ and one at the second stabilizing body end $328_2$. The supplement masses at each end of the stabilizing mass body 328 preferably have the same weight to provide a balanced distribution of weight; however, this need not always be the case. Alternatively, in some embodiment, more or less supplemental masses (e.g. one, four, etc.) may be used to better target certain oscillations for suppression.

Supplemental masses may be attached to the stabilizing mass body 328 in a number of suitable ways, e.g. by mechanical fasteners, adhesives, snap fits, or a combination thereof. Preferably, the supplemental masses are removably attached to the stabilizing mass body 328, e.g. by press fit into a mating recess, to allow for maintenance and/or modification. In some embodiments, the addition of one or more supplemental masses to magnetic stabilizing mass 308 may allow magnetic stabilizing mass 308 to be smaller in size (e.g. more compact) while still achieving an equivalent weight. The supplemental masses preferably include a dense metal, such as a tungsten alloy.

For better vibration suppression, it is preferred that the magnetic stabilizing mass 308 be permitted to develop an initial acceleration with minimal resistance (i.e. minimal magnetic and frictional resistance). This is because apparatus 300 relies upon the movement of magnetic stabilizing mass 308 away from equilibrium position $320_3$ towards the first and second positions $320_1$ and $320_2$ in order to produce the out-of-phase repulsion forces that suppress the targeted oscillations. Accordingly, when magnetic stabilizing mass 308 is located at equilibrium position $320_3$, the repulsion forces between magnets 356 and 360 should be small (or even effectively zero) so that magnetic stabilizing mass 308 may accelerate substantially unencumbered.

The one or more base magnet and the one or more stabilizing mass magnets may be polymagnets. In the example shown, magnets 356 and 360 are polymagnets. As described above, a magnet's orientation may be described by reference to its North and South magnetic poles. Unlike traditional magnets which have a single pair of magnetic poles (e.g. a North pole on one end and a South pole on the other), polymagnets have multiple pairs of magnetic poles. Each polymagnet may be customized (i.e. "tuned") in a number of ways, e.g. ratio of North to South poles, direction of North and South poles, location of North and South poles, and relative strength of each pole. Polymagnets can be oriented to form a polymagnet pairs. Based on the tuning of each polymagnet, the polymagnet pair can have a magnetic repulsion range and a magnetic attraction range. That is, the polymagnets of this polymagnet pair may repel one another when in close proximity and attract each other when outside close proximity. Alternatively, or in addition, the magnetic repulsion force developed between a polymagnet pair may be inversely correlated to distance therebetween. On the other hand, the magnetic attraction force developed between a polymagnet pair may be correlated to the distance therebetween.

In the example shown, first base magnet $356_1$ and first stabilizing mass magnet $360_1$ are oriented to form a first polymagnet pair $366_1$, and second base magnet $356_2$ and second stabilizing mass magnet $360_2$ are oriented to form a second polymagnet pair $366_2$. First polymagnet pair $366_1$ generates a first magnetic repulsion force that increases relative to an offset of magnetic stabilizing mass 308 from the equilibrium position $320_3$ toward the first position $320_1$, and a first magnetic attraction force that decreases relative to the offset of magnetic stabilizing mass 308 from equilibrium position $320_3$ toward the first position $320_1$. Similarly, second polymagnet pair $366_1$ generates a second magnetic repulsion force that increases relative to an offset of magnetic stabilizing mass 308 from the equilibrium position $320_3$ toward the second position $330_2$, and a second magnetic attraction force that decreases relative to the offset of magnetic stabilizing mass 308 from equilibrium position $320_3$ toward the second position $320_1$.

Accordingly, as exemplified in FIG. 10B, when the magnetic stabilizing mass 308 is in first position $320_1$, first polymagnet pair $366_1$ generates a first magnetic repulsion force $350_1$ while second polymagnet pair $366_2$ generates a second magnetic attraction force $354_2$. This may amplify first restoring moment $352_1$, thereby further suppressing the oscillation amplitude of the oscillating body. As exemplified in FIG. 10O, when the magnetic stabilizing mass 308 is in second position $320_2$, second polymagnet pair $366_2$ generates a second magnetic repulsion force $350_2$ while first polymagnet pair $366_1$ generates a first magnetic attraction force $354_1$. Again, this may amplify second restoring moment $352_2$, thereby further suppressing the oscillation amplitude of the oscillating body. Polymagnets pairs $366_1$ and $366_2$ may also make apparatus 300 more sensitive to oscillation's having a smaller amplitude as the magnetic attraction forces on one side of the pivot axis 314 work together with the magnetic repulsion forces on the other side of the pivot axis 314 as the magnetic stabilizing mass 308 pivots in reaction to an oscillation.

In the example shown, apparatus 300 does not include a magnetic field shield. However, in alternative embodiments, apparatus 300 may further include a magnetic field shield (not shown, but similar to magnetic field shield 184 of FIG. 2). Similar to magnetic field shield 184, the magnetic field shield may help reduce the spread of magnetic fields emitted by magnetic base 304 and/or magnetic stabilizing mass 308 outside of apparatus 300. This may reduce the risk that apparatus 300 may interfere with or damage electronic equipment (e.g. hard disk drives), cards with magnetic strips, pacemakers, and other articles/devices. The magnetic field shield may be connected to magnetic base 304, e.g. by mechanical fasteners, adhesive, or a combination thereof, and sized and positioned to overlay magnets 356 and 360. For example, magnetic field shield may have a "C"-shape that extends from first base end $304_1$, over magnetic stabilizing mass 308, to the second base end $304_2$.

Preferably, the magnetic field shield has a material, thickness, and surface area suitable to suppress magnetic fields from passing therethrough. In some embodiments, the magnetic field shield is composed primarily of a nickel-iron, low-expansion allow containing 36% nickel (also known as Invar 36, FeNi36, or 64FeNi). Preferably, the magnetic field shield is removably connected to magnetic base 304 (i.e. the magnetic field shield can be selectively attached, removed, and reattached). This allows the magnetic field shield to be removed when not required, or to access magnetic stabilizing mass 308, pivot assembly 312, and/or magnets 356 or 360.

Figure 11A:
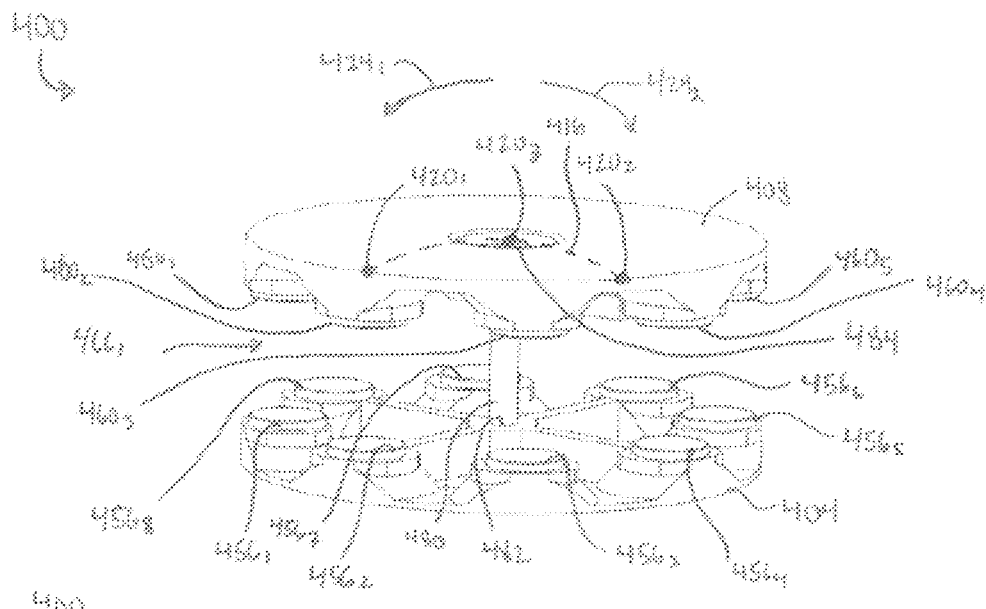
FIG. 11A is a perspective view of an apparatus for suppressing oscillations with a magnetic stabilizing mass in an equilibrium position, in accordance with another embodiment.
Figure 11B:
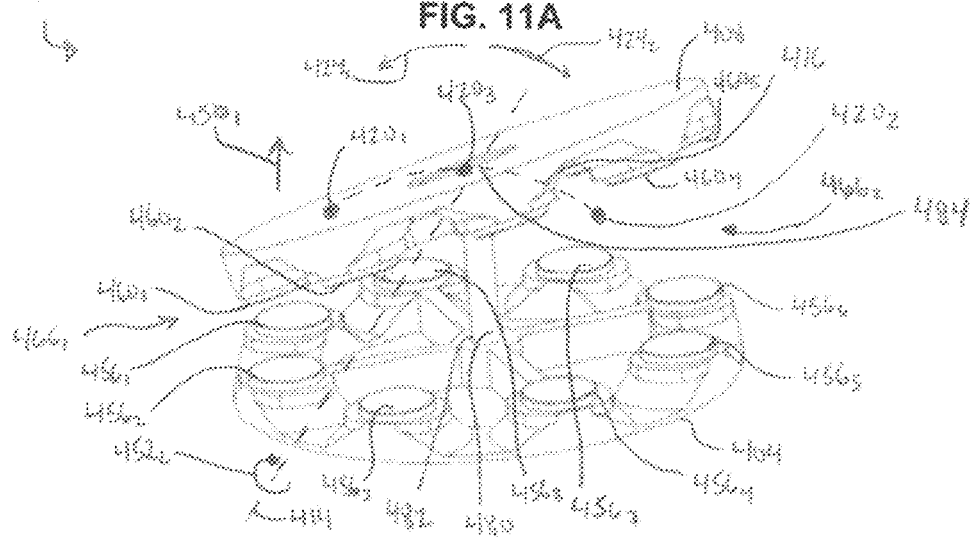
FIG. 11B is a perspective view of the apparatus of FIG. 11A with the magnetic stabilizing mass in a first position.
Figure 11C:
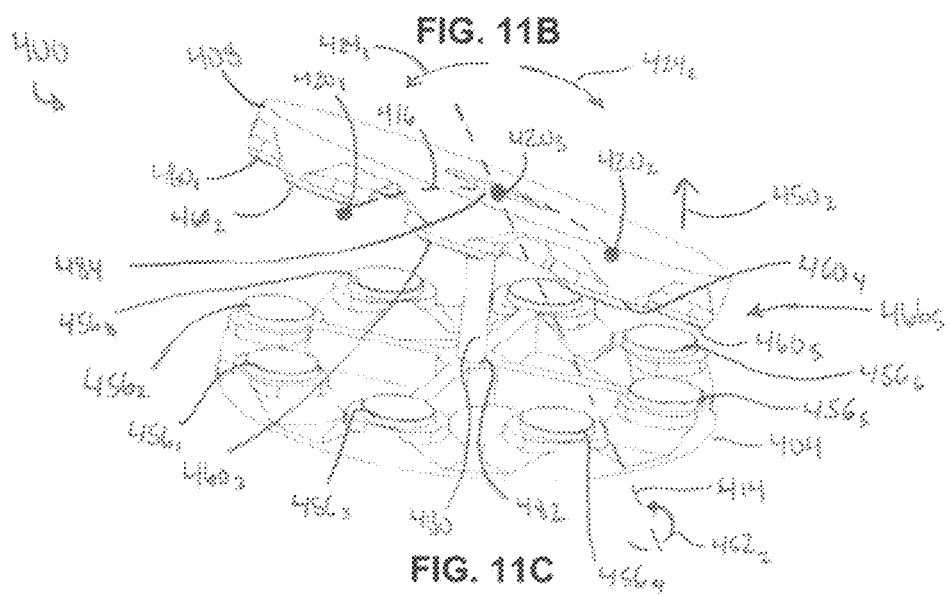
FIG. 11C is a perspective view of the apparatus of FIG. 11A with the magnetic stabilizing mass in a second position.

FIGS. 11A-11C illustrate another example apparatus, referred to generally as 400, for suppressing oscillations of an oscillating body. Apparatus 400 shown in FIGS. 11A-11C is analogous to apparatus 300 shown in FIGS. 10A-100, except for differences in pivot assembly 412, shape of magnetic base 404 and magnetic stabilizing mass 408, and the number and arrangement of magnets 456 and 460. Unless otherwise noted, like-numbered elements (i.e., elements having reference numerals that share two least-significant digits, or two least significant digits and an alphabetic character where applicable) have similar structure and/or perform similar function as those in the example apparatus 300 shown in FIGS. 10A-10C. For example, magnetic base 304 is analogous to magnetic base 404.

Referring to FIGS. 11A-11C, magnetic base 404 and magnetic stabilizing mass 408 are both circular (also referred to as discs). Magnetic stabilizing mass 408 is pivotable coupled to the magnetic base 404 by a pivot assembly 412. In the example shown, the pivot assembly 412 includes a spacer rod 480 that extends perpendicularly from magnetic base 404 and a swivel joint 484 (also referred to as a ball and socket joint) that couples spacer rod 480, at a distal end thereof, to magnetic stabilizing mass 408. A proximal end of spacer rod 480 may be coupled to magnetic base 404 in a number of suitable ways, e.g. by mechanical fasteners, adhesive, etc. In the example shown, spacer rod 480 extends through a central aperture 482 in magnetic base 404 and is mechanical fastened to magnetic base 404 with a screw (not shown). In the example shown, spacer rod 480 is located so that magnetic base 404 and magnetic stabilizing mass are concentric. Such alignment may provide a symmetry that may simplify the design. Alternatively, other non-concentric arrangements are possible.

The length of spacer rod 480 may be varied across alternative embodiments to adjust a separation (also referred to as a resting distance) between magnetic base 404 and magnetic stabilizing base 408. For example, the length of spacer rod 480 may be used to vary the sensitivity level of apparatus 400. All else being equal, an apparatus 400 with a shorter spacer rod will be more sensitive than one with a longer spacer rod since magnetic repulsion forces may be developed between magnetic stabilizing mass 408 and magnetic base 404 for small amplitude oscillations.

FIGS. 11A-11C illustrate exemplary movements of a magnetic stabilizing mass 408 that is pivotably coupled to magnetic base 404 by swivel joint 484. Magnetic stabilizing mass 408 is pivotable with at least two rotational degrees of freedom relative to the pivot assembly 412 (i.e. it rotates about at least X and Y axis, and possibly but not necessarily the Z axis [Z axis is parallel to the spacer rod 480, normal to the magnetic base 404]). That is, swivel joint 484 allows (e.g. constrains) magnetic stabilizing mass 408 to move (i.e. pivot) along a curved linear path, between a plurality of first positions (e.g. first position $420_1$) and a plurality second positions (e.g. second position $420_2$). Accordingly, swivel joint 484 defines a pivot axis 414 that may rotate about spacer rod 480 relative to the magnetic base 404, according to the direction of the oscillation. Swivel joint 484 may effectively allow magnetic stabilizing mass 408 to pivot along a plurality of curved linear paths (curved linear path 416 being just one example). It will be understood that first and second positions $420_1$ and $420_2$ are examples intended for illustrative purposes. Owing to the flexibility of swivel joint 484, first directions and second directions may vary according to the direction of the oscillation.

An equilibrium position $420_3$ is located between the plurality of first positions and the plurality of second positions. A plurality of first directions may be defined by a curve oriented from equilibrium position $420_3$ toward one of the plurality of first positions (e.g. first position $420_1$). For example, a first direction $424_1$ may be defined by a curve oriented from equilibrium position $420_3$ towards first position $420_1$. It will be understood that first direction $424_1$ is one of many possible first directions that may vary according to the direction of the oscillation. Similarly, a plurality of second directions may be defined by a curve oriented from equilibrium position $420_3$ toward one of the plurality of second positions (e.g. second position $420_2$). For example, a second direction $424_2$ may be defined by a curve oriented from equilibrium position $420_3$ towards second position $420_2$. Again, it will be understood that second direction $424_2$ is one of many possible section directions that may vary according to the direction of the oscillation.

Magnetic base 404 may include a plurality of base magnets 456. In the example shown, the plurality of base magnets 456 is eight base magnets $456_1$, $456_2$, $456_3$, $456_4$, $456_5$, $456_6$, $456_7$, and $456_8$ distributed circumferentially around magnetic base 404. Similarly, magnetic stabilizing mass 408 may include a plurality of stabilizing mass magnets 456. In the example shown, the plurality of stabilizing mass magnets 460 is eight stabilizing mass magnets distributed circumferentially around magnetic stabilizing mass 408 (magnets $460_1$, $460_2$, $460_3$, $460_4$, $460_5$; the remaining three magnets are hidden). In the example shown, base magnets 456 are evenly distributed and the stabilizing mass magnets 460 are evenly distributed. Evenly distributing base magnets 456 and/or plurality stabilizing mass magnets 460 may promote an even magnetic field distribution.

In alternative embodiments, more of less magnets 456 and 460 may be used. In other alternative embodiments, the plurality of base magnets 456 and/or the plurality of stabilizing mass magnets 460 may be distributed differently (e.g. an irregular interval). Magnets 456 and 460 are preferably located proximate the circumference of magnetic base 404 and magnetic stabilizing mass 408, respectively. Similar to FIGS. 10A-10C, magnets 456 and 460 are located in corresponding magnets recesses. Magnets 456 and 460 may be removable connected to their corresponding magnet recess, e.g. by press fit and/or mechanical fasteners. Alternatively, or in addition, an adhesive may be used to secure magnets 456 and 460 to magnetic base 404 and magnetic stabilizing mass 408, respectively.

In the example shown, each base magnet 456 is oriented to repel a corresponding stabilizing mass magnet 460. For example, base magnet $456_1$ is oriented to repel stabilizing base magnet $460_1$, and base magnet $456_5$ is oriented to repel stabilizing base magnet $460_5$. In a preferred embodiment, swivel joint 484 constrains rotation of magnetic stabilizing mass 408 about spacer rod 480 relative to magnetic base 404. This may help maintain alignment between base magnets 456 and corresponding stabilizing mass magnets 460 as magnetic stabilizing mass 408 pivots in reaction to an oscillation.

Accordingly, as shown in FIG. 11B, when magnetic stabilizing mass 408 is offset from equilibrium position $420_3$ towards first position $420_1$, base magnet $456_1$ and stabilizing mass magnet $460_1$ are positioned and oriented to generate together a magnetic repulsion force $450_1$ which urges magnetic stabilizing mass 408 to move (i.e. pivot) towards equilibrium position $420_3$. Magnetic repulsion force $450_1$ produces a restoring moment $452_1$ about the pivot axis 414 that urges the magnetic base 404 to move in the first direction $424_1$ (i.e. in opposition to the oscillation). The result is that the oscillation amplitude in the second direction $424_2$ is reduced.

Similarly, as shown in FIG. 100, when magnetic stabilizing mass 408 is offset from equilibrium position $420_3$ towards second position $420_2$, base magnet $456_5$ and stabilizing mass magnet $460_5$ are positioned and oriented to generate together a magnetic repulsion force $450_5$ which urges magnetic stabilizing mass 408 to pivot (i.e. pivot) towards equilibrium position $420_3$. Magnetic repulsion force $450_5$ produces a restoring moment $452_5$ about the pivot axis 414 that urges the magnetic base 404 to move in second direction $424_2$ (i.e. in opposition to the oscillation). The result is that the oscillation amplitude in the first direction $424_1$ is reduced. As described above, owing to the flexibility of swivel joint 484, first and second directions $424_1$ and $424_2$ are two examples of many possible directions in which oscillation amplitude may be reduced. In this way, apparatus 400 may allow for the suppression of an oscillation's amplitude in multiple directions, e.g. elbow flexion-tension and elbow rotation.

Magnets 456 and 460 are preferably polymagnets. In alternative embodiments, magnets 456 and 460 may be permanent magnets. As described above, polymagnets may have multiple pairs of magnetic poles. Each polymagnet may be customized (i.e. "tuned") in a number of ways, e.g. ratio of North to South poles, location/direction of North and South poles, and relative strength of each pole. Polymagnets can be oriented to form a polymagnet pairs. Based on the tuning of each polymagnet, the polymagnet pair can have a magnetic repulsion range and a magnetic attraction range. That is, the polymagnets of this polymagnet pair may repel one another when in close proximity and attract each other when outside close proximity. Alternatively, or in addition, the magnetic repulsion force developed between a polymagnet pair may be inversely correlated to distance therebetween. On the other hand, the magnetic attraction force developed between a polymagnet pair may be correlated to the distance therebetween.

In the example shown, each base polymagnet 456 corresponds with one of the stabilizing mass polymagnets 460 to form a plurality of polymagnet pairs. For example, base polymagnet $456_1$ and stabilizing mass polymagnet $460_1$ form a polymagnet pair $466_1$; base magnet $456_2$ and stabilizing mass magnet $460_2$ form a polymagnet pair; so on and so forth (only polymagnet pairs $466_1$ and $466_5$ are illustrated). These polymagnet pairs function in a similar manner as polymagnet pairs $366_1$ and $366_2$ described above with reference to FIGS. 10A-10C.

Figure 12A:
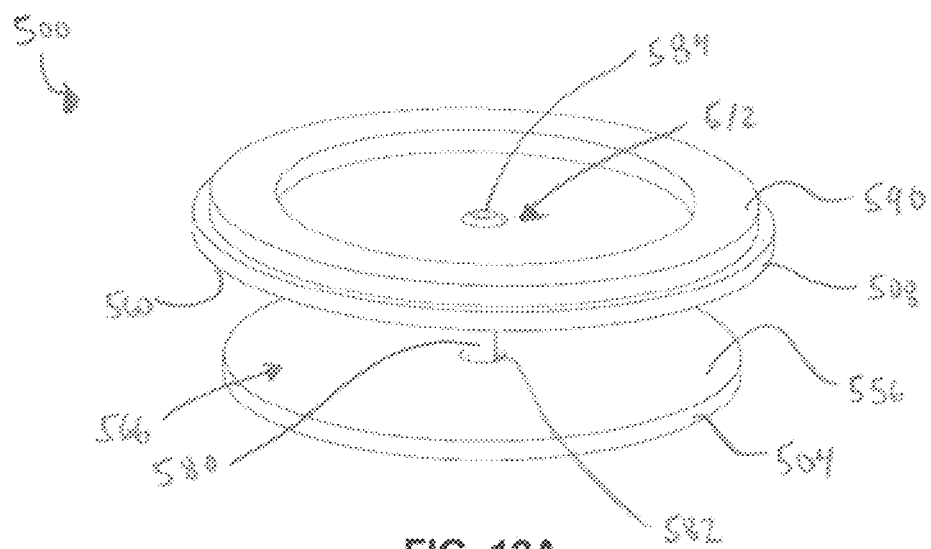
FIG. 12A is a perspective view of an apparatus for suppressing oscillations with a magnetic stabilizing mass in an equilibrium position, in accordance with another embodiment.

FIGS. 12A-120 illustrate another example apparatus, referred to generally as 500, for suppressing oscillations of an oscillating body. Apparatus 500 shown in FIGS. 12A-120 is analogous to apparatus 400 shown in FIGS. 11A-11C, except for differences in pivot assembly 512, and the number and arrangement of magnets 556 and 560. Unless otherwise noted, like-numbered elements (i.e., elements having reference numerals that share two least-significant digits, or two least significant digits and an alphabetic character where applicable) have similar structure and/or perform similar function as those in the example apparatus 400 shown in FIGS. 11A-11C. For example, spacer rod 480 is analogous to spacer rod 580.

Figure 12B:
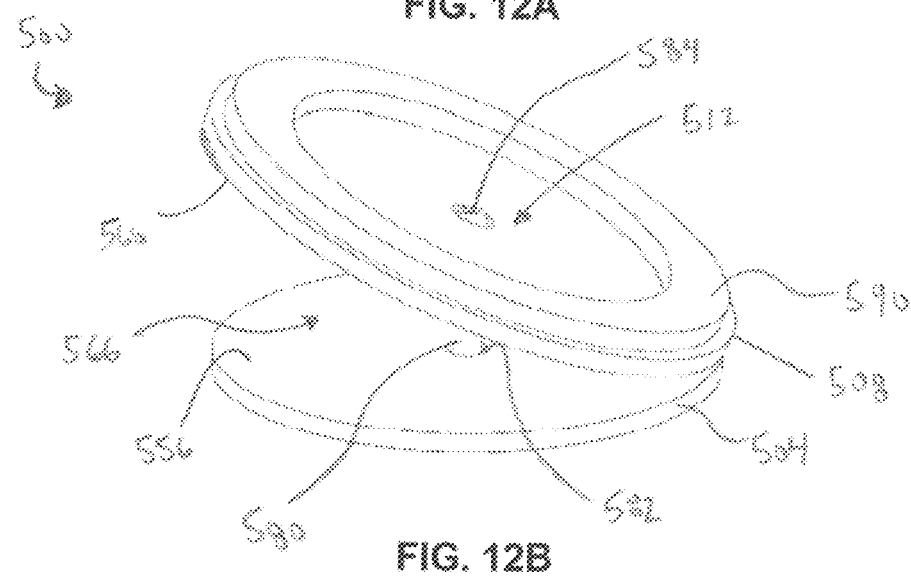
FIG. 12B is a perspective view of the apparatus of FIG. 12A with the magnetic stabilizing mass in a first position.
Figure 12C:
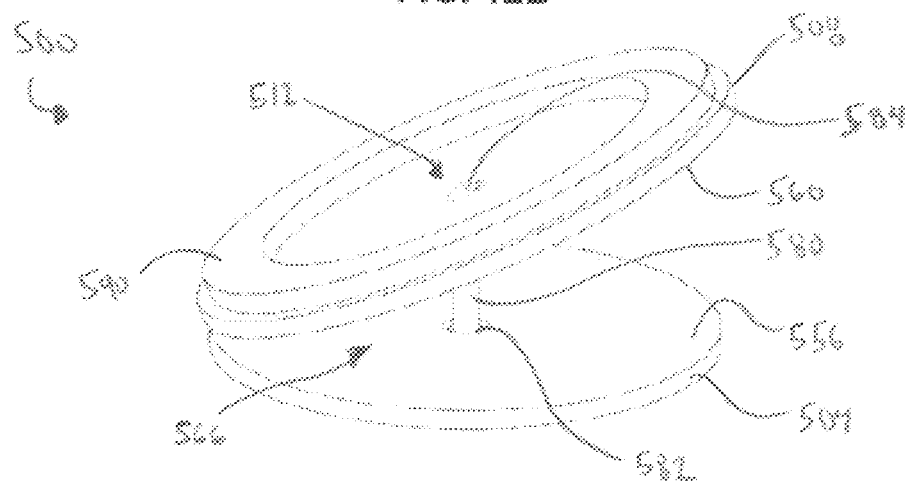
FIG. 12C is a perspective view of the apparatus of FIG. 12A with the magnetic stabilizing mass in a second position.

Referring to FIGS. 12A-12C, magnetic stabilizing mass 508 is pivotably coupled to the magnetic base 504 by a pivot assembly 512. In the example shown, the pivot assembly 512 includes a spacer rod 580 that extends generally perpendicularly from magnetic base 504 and a ball and socket joint 584 that couples spacer rod 580, at an upper end thereof, to magnetic stabilizing mass 508. Ball and socket joint 584 may be a "universal" ball and socket joint. Spacer rod 880 may be coupled to magnetic base 504 in a number of suitable ways, e.g. by mechanical fasteners, adhesive, etc. In the example shown, spacer rod 580 extends through a central aperture 582 in magnetic base 504 and is mechanical fastened to magnetic base 504 with a screw (not shown).

Magnetic base 504 includes a circular base magnet 556 (also referred to as a base disc magnet). Similarly, magnetic stabilizing mass 508 includes a circular stabilizing mass magnet 560 (also referred to a stabilizing mass disc magnet). Disc magnets 556 and 558 may promote even magnetic field distributions around magnetic base 506 and magnetic stabilizing base 508, respectively. In the example shown, base disc magnet 556 and stabilizing mass disc magnet 560 have diameters that are generally equal to the diameters of magnetic base 504 and magnetic stabilizing mass 508, respectively. This may provide for the greatest area of interaction between the magnetic fields of each disc magnet 556 and 560. In alternative embodiments, base disc magnet 556 and/or stabilizing mass disc magnet 560 may have diameters than are smaller than the diameter of magnetic base 504 and magnetic stabilizing mass 508, respectively.

In some embodiments, ball and socket joint 584 does not constrain rotation of magnetic stabilizing mass 508 about spacer rod 580 relative to magnetic base 504. In such embodiments, since base disc magnet 556 and stabilizing mass disc magnet 560 cover the majority of the faces of magnetic base 504 and magnetic stabilizing mass 508, respectively, rotational misalignment is not a substantial concern.

The diameter of magnetic stabilizing base 508 is preferably slightly larger than the diameter of magnetic base 504. For example, the diameter of magnetic stabilizing base 508 may be about 105 to 140% larger than the diameter of magnetic base 504. This may ensure that there is significant interaction between the magnetic fields of magnetic base 504 and magnetic stabilizing mass 508 when the magnetic stabilizing mass 508 is pivoted to its extremes (e.g. as shown in FIGS. 12B and 12C). In the example shown, the diameter of magnetic stabilizing base 508 is 110% larger than the diameter of magnetic base 504. The selected diameters of magnetic base 504 and magnetic stabilizing mass 508 may depend on the type and strength of disc magnets 556 and 560 and/or the length of spacer rod 580. Alternatively, the diameters of magnetic base 504 and magnetic stabilizing mass 508 may be equal.

Disc magnets 456 and 460 are preferably polymagnets. In alternative embodiments, magnets 456 and 460 may be permanent magnets. In the example shown, base disc polymagnet 556 and stabilizing mass disc polymagnet 560 are oriented to form a polymagnet pair 566. Polymagnet pair 566 functions in a similar manner as polymagnet pairs $366_1$ and $366_2$ described above with reference to FIGS. 10A-100.

In the example shown, magnetic stabilizing base 508 includes a supplement mass 590 attached thereto. Supplemental mass 590 may be secured to magnetic stabilizing mass 508 as desired to amplify the magnetic repulsion forces developed between the disc magnets 556 and 560, thereby amplifying the restoring torques that are produced. In the example shown, supplemental mass 590 is a ring weight. Preferably, to optimize amplification, supplemental mass 590 has a diameter only slightly smaller than the diameter of magnetic stabilizing mass 508. Supplemental mass 590 may be attached to magnetic stabilizing mass 508 in a number of suitable ways, e.g. by mechanical fasteners, adhesives, snap fits, or a combination thereof. Preferably, supplemental mass 590 is removably connected to magnetic stabilizing mass 508, e.g. to allow for maintenance and/or modification. In the example shown, supplemental mass 590 is press fit with a mating recess defined in the magnetic stabilizing mass 508.

In some embodiments, the addition of supplemental mass 590 to magnetic stabilizing mass 508 may allow magnetic stabilizing mass 508 to be smaller in size (e.g. more compact) while still achieving an equivalent weight. Supplemental mass 590 preferably includes a dense metal, such as a tungsten alloy.

Reference is now made to FIGS. 13-19, which show an apparatus 1000 attached to a variety of different oscillating bodies 172. It will be understood that apparatus 1000 may be apparatus 100 of FIGS. 1-9, apparatus 300 of FIG. 10A-10C, apparatus 400 of FIGS. 11A-11C or apparatus 500 of FIGS. 12A-12C.

Figure 13:
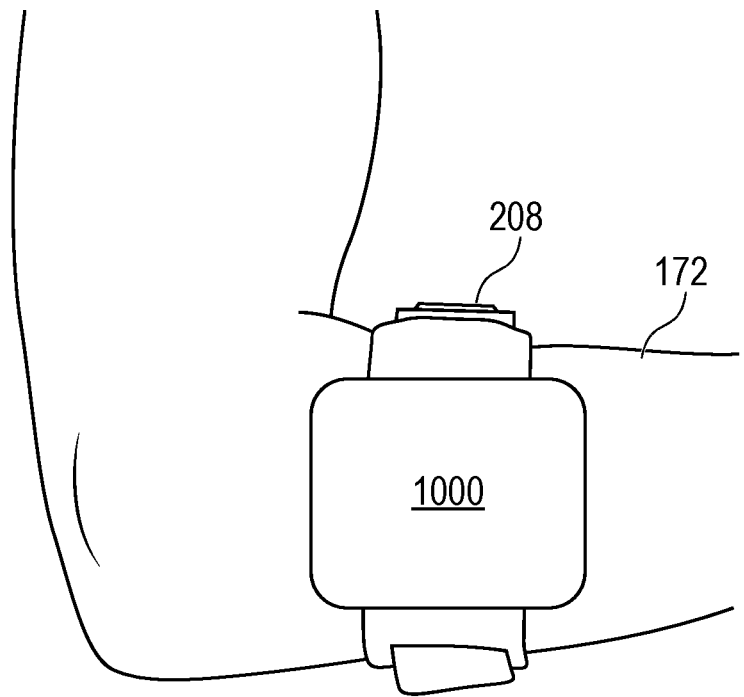
FIG. 13 shows an apparatus for suppressing oscillation mounted to a user, in accordance with an embodiment.

In FIG. 13, apparatus 1000 is rigidly connected to an oscillating body 172 that is a user's arm. In this application, apparatus 1000 may help to suppress involuntary arm tremors, such as tremors caused by Parkinson's disease or Essential Tremor. As shown, apparatus 1000 may be connected to oscillating body 172 by a mounting member 208. In various embodiments and applications, mounting member 208 may be an arm strap as shown, a rope/cable/cord, a sleeve/sheath, adhesive, a fastener (e.g. screw, bolt, nail, or rivet), welds, or hook and loop fastener (e.g. Velcro™) for example. In some embodiments, apparatus 1000 may be permanently connected to the oscillating body 172, and in other embodiments apparatus 1000 may be removably connected to the oscillating body 172.

In other alternative embodiments, the mounting member 208 may be a harness or glove to which the apparatus 1000 may be removable coupled (e.g. by snap connection, by insertion, etc.). Such a harness or glove may conform to shape and size of the oscillating body, e.g. the user's arm or thigh.

Figure 14:
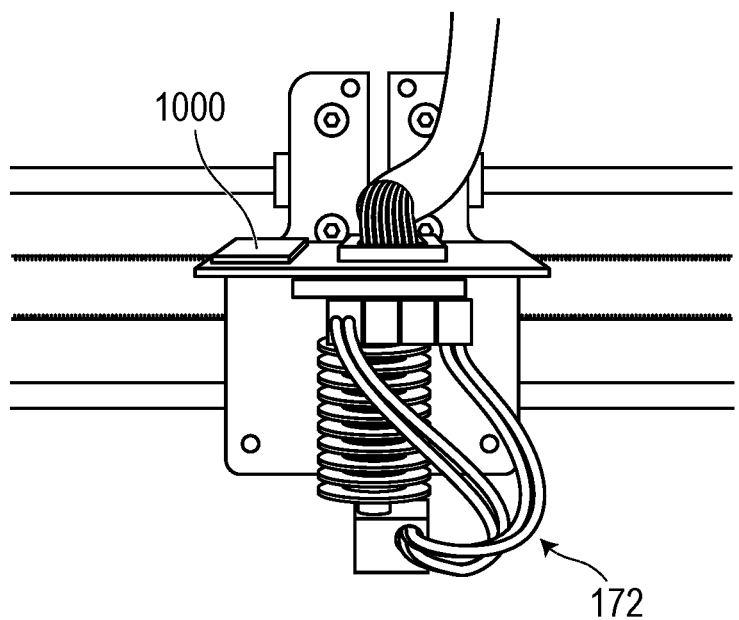
FIG. 14 shows an apparatus for suppressing oscillation mounted to a 3D printer print head, in accordance with an embodiment.

In FIG. 14, apparatus 1000 is rigidly connected to an oscillating body 172 that is a 3D printer print head (e.g. print head of an FDM 3D printer). In this application, apparatus 1000 may help to suppress oscillations of the print head 172 that may occur during printing operations. For example, 3D printer print heads 172 are known to experience an oscillation known as "ringing" when the print head 172 changes direction sharply, which results in rippled print surfaces. Thus, by suppressing oscillations of print head 172, apparatus 1000 may contribute to better quality 3D prints.

Figure 16:
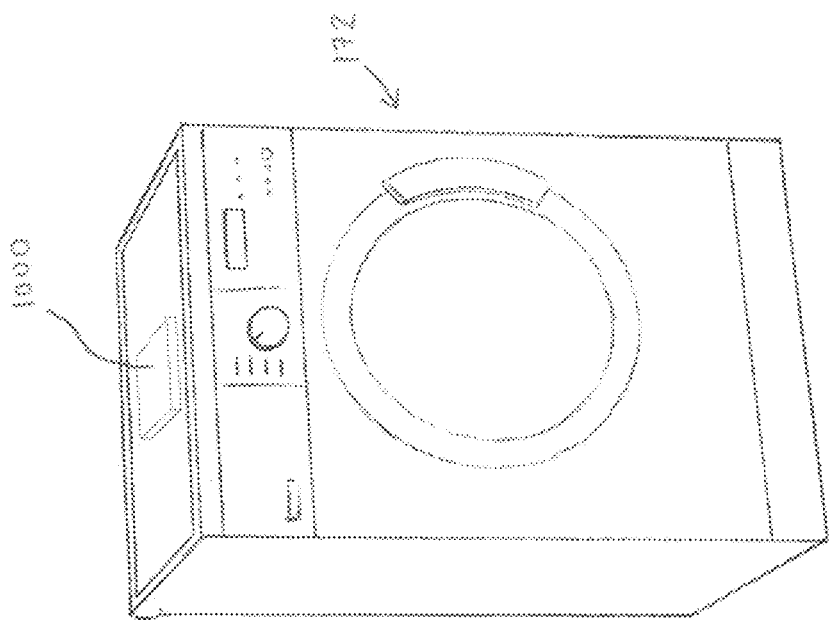
FIG. 16 shows an apparatus for suppressing oscillation mounted to a clothing dryer, in accordance with an embodiment.
Figure 15:
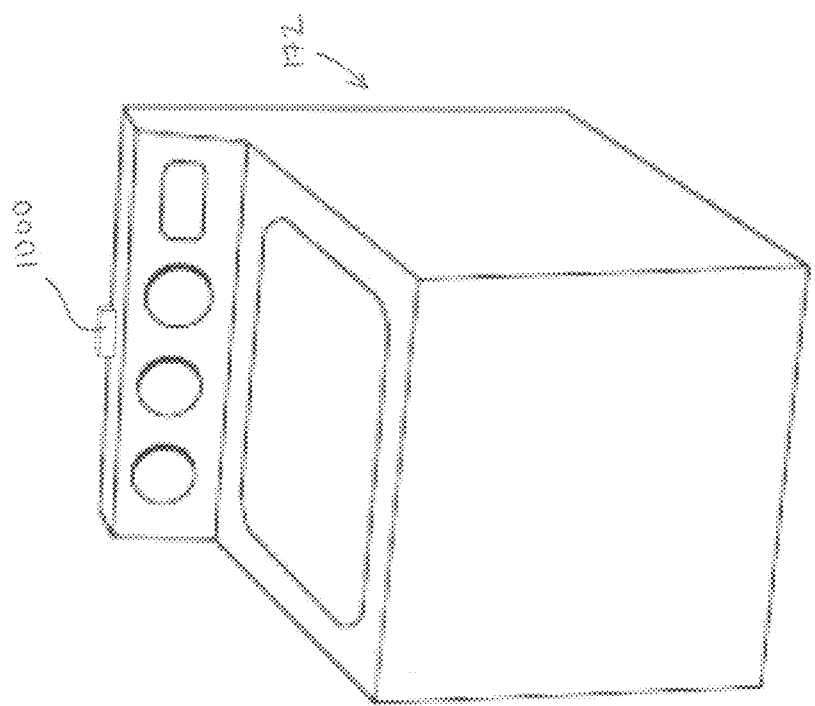
FIG. 15 shows an apparatus for suppressing oscillation mounted to a clothing washing machine, in accordance with an embodiment.

In FIGS. 15-16, apparatus 1000 is rigidly connected to an oscillating body 172 that is a home appliance (e.g. the clothing washing machine 172 of FIG. 15, or the clothing dryer 172 of FIG. 16). Rotating drums within washing machines and dryers produce oscillations, which can generate noise and in some cases cause damage to the appliance. Thus, by suppressing oscillations of home appliances 172, apparatus 1000 may help reduce noise and mitigate damage to the appliances 172.

Figure 17:
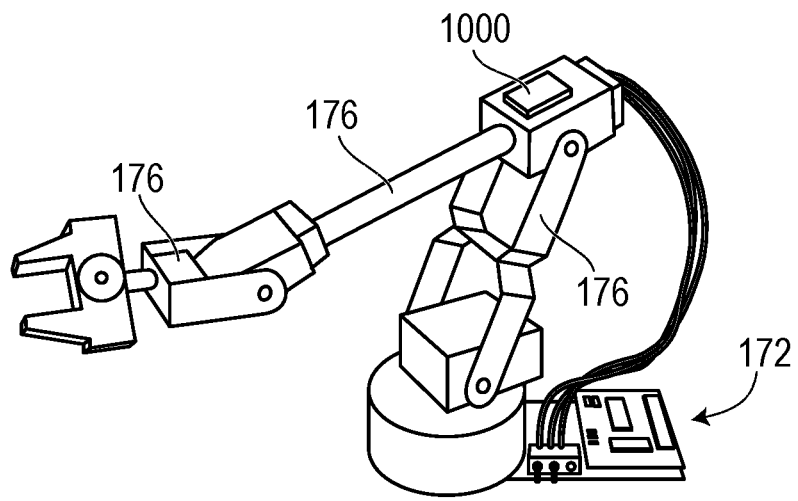
FIG. 17 shows an apparatus for suppressing oscillation mounted to a robotic arm, in accordance with an embodiment.

In FIG. 17, apparatus 1000 is rigidly connected to an oscillating body 172 that is a robotic arm. Arm segments 176 of a robotic arm 172 may experience oscillations during programmed movements due to their cantilevered configuration, which may reduce movement and positional accuracies. Thus, by suppressing oscillations of robotic arm 172, apparatus 1000 may contribute to better movement and positional accuracies of robotic arm 172.

Figure 18:
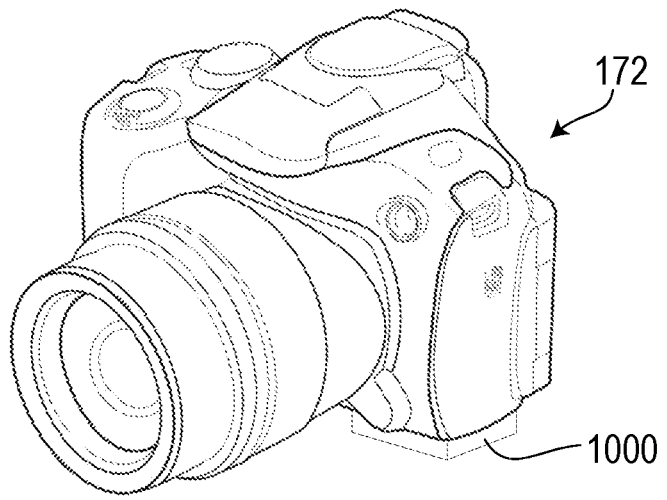
FIG. 18 shows an apparatus for suppressing oscillation mounted to a camera, in accordance with an embodiment.
Figure 19:
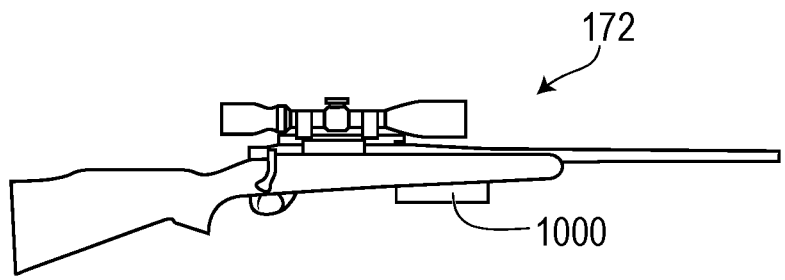
FIG. 19 shows an apparatus for suppressing oscillation mounted to a firearm, in accordance with an embodiment.

In FIGS. 18 and 19, apparatus 1000 is rigidly connected to an oscillating body 172 that is a handheld article (a camera in FIG. 18, and a firearm in FIG. 19). In this case, when a user grasps the handheld article, it is the user that imparts oscillations upon the handheld article 172, and which characterizes the article as an oscillating body. For example, users of cameras and firearms 172 (i.e. photographers and hunters) practice various techniques to reduce shake upon the camera or firearm 172, in order to avoid a blurry image (or shaky video recording) or inaccurate shot. Apparatus 1000 when affixed to a handheld article 172 (e.g. the camera of FIG. 18 or the firearm of FIG. 19) may be effective for suppressing oscillations imparted to that handheld article 172 by the user. In the context of cameras and firearms 172, this may help to produce a clearer image (or more still video recording) or more accurate shot.

For many applications, including for example the applications noted above, apparatus 1000 may be configured to provide suppression for oscillation frequencies in a range of 1-20 Hz, or in a range of 10-50 kHz. To suppress oscillation frequencies in both frequency ranges, two apparatus 1000 may be connected to the same oscillating body. In alternative embodiments, apparatus 1000 may be configured to provide oscillation suppression for oscillation frequencies outside of these ranges.

As described above, the damper mass ratio (i.e. ratio of oscillating body mass to mass of magnetic stabilizing mass) may be at least 5:1 in many embodiments. The following are non-limiting examples of the mass of magnetic stabilizing mass 108, 308, 408, 508 in various applications. In FIG. 13, magnetic stabilizing mass may be 0.1 kg to 1 kg; in FIG. 14, magnetic stabilizing mass may be 0.02 kg to 0.2 kg; in FIGS. 15-16, magnetic stabilizing mass may be 2 kg to 20 kg; in FIG. 17, magnetic stabilizing mass may be 0.3 kg to 3 kg; in FIG. 18, magnetic stabilizing mass may be 0.05 kg to 0.5 kg; and in FIG. 19, magnetic mass may be 0.06 kg to 0.6 kg.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: An apparatus for suppressing oscillations of an oscillating body, the apparatus comprising:
 a magnetic housing securable to the oscillating body, the magnetic housing defining a housing interior;
 a magnetic stabilizing mass slideably coupled to the magnetic housing in the housing interior by a bearing assembly, the magnetic stabilizing mass being slideable between a first position and a second position, the magnetic stabilizing mass having an equilibrium position between the first position and the second position;
 the magnetic housing producing magnetic fields that magnetically repel the magnetic stabilizing mass away from the first position at least when the magnetic stabilizing mass is offset from the equilibrium position toward the first position, and that magnetically repel the magnetic stabilizing mass away from the second position at least when the magnetic stabilizing mass is offset from the equilibrium position toward the second position.

Item 2: The apparatus of any preceding item, wherein the magnetic housing comprises one or more housing magnets, which collectively produce the magnetic fields.

Item 3: The apparatus of any preceding item, wherein the magnetic stabilizing mass comprises one or more stabilizing mass magnets, which collectively produce magnetic fields extending within the housing interior.

Item 4: The apparatus of any preceding item, further comprising an arm strap coupled to the housing.

Item 5: The apparatus of any preceding item, further comprising:
 a magnetic field shield coupled to the magnetic housing, the magnetic field shield overlaying at least the one or more housing magnets and the one or more stabilizing mass magnets.

Item 6: The apparatus of any preceding item, wherein the magnetic field shield is removably coupled to the magnetic housing.

Item 7: The apparatus of any preceding item, wherein the magnetic stabilizing mass comprises a tungsten alloy.

Item 8: The apparatus of any preceding item, wherein each of the one or more housing magnets and the one or more stabilizing mass magnets is a permanent magnet.

Item 9: The apparatus of any preceding item, wherein the housing interior is open to an external environment.

Item 10: The apparatus of any preceding item, wherein:
 the one or more housing magnets and the one or more stabilizing mass magnets are collectively positioned to generate a first magnetic repulsion force that increases relative to an offset of the magnetic stabilizing mass from the equilibrium position toward the first position, and a second magnetic repulsion force that increases relative to an offset of the magnetic stabilizing mass from the equilibrium position toward the second position.

Item 11: The apparatus of any preceding item, wherein
the magnetic housing comprises a housing front end and a housing rear end, the housing front end opposite the housing rear end,
the magnetic stabilizing mass comprises a stabilizing mass front end and a stabilizing mass rear end, the stabilizing mass front end opposite the stabilizing mass rear end,
in the first position, the stabilizing mass rear end is proximate to the housing rear end, and
in the second position, the stabilizing mass front end is proximate to the housing front end.

Item 12: The apparatus of any preceding item, wherein the one or more housing magnets comprise a front housing magnet at the housing front end and a rear housing magnet at the housing rear end.

Item 13: The apparatus of any preceding item, wherein the one or more stabilizing mass magnets comprise a front stabilizing mass magnet at the stabilizing mass front end and a rear stabilizing mass magnet at the stabilizing mass rear end.

Item 14: The apparatus of any preceding item, wherein the rear housing magnet is oriented to repel the rear stabilizing mass magnet, and the front housing magnet is oriented to repel the front stabilizing mass magnet.

Item 15: The apparatus of any preceding item, wherein the bearing assembly constrains the magnetic stabilizing mass to sliding between the first position and the second position along a linear path.

Item 16: The apparatus of any preceding item, wherein the linear path is straight.

Item 17: The apparatus of any preceding item, wherein the linear path is curved.

Item 18: The apparatus of any preceding item, wherein the magnetic stabilizing mass is suspended in the housing interior by the bearing assembly.

Item 19: The apparatus of any preceding item, wherein the bearing assembly comprises a guide rail supporting the magnetic stabilizing mass and constraining the magnetic stabilizing mass to sliding between the first position and the second position along a linear path.

Item 20: The apparatus of any preceding item, wherein the guide rail extends through the magnetic stabilizing mass.

Item 21: A method of suppressing oscillations of an oscillating body, the method comprising:
securing a magnetic housing to the oscillating body, the magnetic housing containing a magnetic stabilizing mass slideable between a first position and a second position through an equilibrium position; and
in response to an oscillation of the oscillating body, the secured magnetic housing magnetically repelling the magnetic stabilizing mass away from the first position and second positions toward the equilibrium position, suppressing the oscillation.

Item 22: The method of any preceding item further comprising a user grasping the oscillating body and imparting the oscillation to the oscillating body.

Item 23: The method of any preceding item, wherein the secured magnetic housing magnetically repelling the magnetic stabilizing mass comprises: the magnetic stabilizing mass sliding in the magnetic housing.

Item 24: The method of any preceding item, wherein the magnetic stabilizing mass sliding in the magnetic housing comprises: the magnetic stabilizing mass sliding along a linear path.

Item 25: The method of any preceding item, wherein the magnetic stabilizing mass sliding in the magnetic housing comprises: the magnetic stabilizing mass sliding along a curved linear path.

Item 26: The method of any preceding item, wherein the magnetic stabilizing mass is suspended in the magnetic housing by a bearing assembly.

Item 27: The method of any preceding item, wherein the secured magnetic housing magnetically repelling the magnetic stabilizing mass comprises:
generating magnetic repulsion forces that increase relative to an offset of the magnetic stabilizing mass from the equilibrium position toward the first and second positions.

Item 28: The method of any preceding item, wherein the secured magnetic housing magnetically repelling the magnetic stabilizing mass comprises repeatedly:
the magnetic stabilizing mass sliding from the equilibrium position toward the first position;
a first housing magnet magnetically repelling the magnetic stabilizing mass away from the first position toward the equilibrium position;
the magnetic stabilizing mass sliding from the equilibrium position toward the second position; and
a second housing magnet magnetically repelling the magnetic stabilizing mass away from the second position toward the equilibrium position.

Item 29: The method of any preceding item, wherein:
the first housing magnet magnetically repelling the magnetic stabilizing mass comprises the first housing magnet and a first stabilizing mass magnet generating a first repulsive force, and
the second housing magnet magnetically repelling the magnetic stabilizing mass comprises the second housing magnet and a second stabilizing mass magnet generating a second repulsive force.

Item 30: The method of any preceding item, wherein the oscillating body is a user's arm.

Item 31: The method of any preceding item, wherein the oscillating body is a 3D printer print head.

Item 32: The method of any preceding item, wherein the oscillating body is a household appliance.

Item 33: The method of any preceding item, wherein the oscillating body is a robotic arm.

Item 34: The method of any preceding item, wherein the oscillating body is a camera.

Item 35: The method of any preceding item, further comprising a user grasping the camera and imparting the oscillation to the camera.

Item 36: The method of any preceding item, wherein said the oscillating body is a firearm.

Item 37: The method of any preceding item, further comprising a user grasping the firearm and imparting the oscillation to the firearm.

Item 38: An apparatus for suppressing oscillations of an oscillating body, the apparatus comprising:
a magnetic base securable to the oscillating body;
a magnetic stabilizing mass pivotably coupled to the magnetic base by a pivot assembly, the magnetic stabilizing mass being pivotable between at least a first position and a second position, the magnetic stabilizing mass having an equilibrium position between the first position and the second position;

the magnetic base producing a base magnetic field that magnetically repels the magnetic stabilizing mass away from the first position at least when the magnetic stabilizing mass is offset from the equilibrium position toward the first position, and that magnetically repels the magnetic stabilizing mass away from the second position at least when the magnetic stabilizing mass is offset from the equilibrium position toward the second position.

Item 39: The apparatus of any preceding item, wherein:
the magnetic base comprises one or more base magnets, which collectively produce the base magnetic field, and
the magnetic stabilizing mass comprises one or more stabilizing mass magnets, which collectively produce a mass magnetic field extending generally toward the base magnetic field.

Item 40: The apparatus of any preceding item, wherein:
the one or more housing magnets and the one or more stabilizing mass magnets are collectively positioned to generate a first magnetic repulsion force that increases relative to an offset of the magnetic stabilizing mass from the equilibrium position toward the first position, and a second magnetic repulsion force that increases relative to an offset of the magnetic stabilizing mass from the equilibrium position toward the second position.

Item 41: The apparatus of any preceding item, further comprising:
a magnetic field shield coupled to the magnetic base, the magnetic field shield overlaying at least the one or more base magnets and the one or more stabilizing mass magnets.

Item 42: The apparatus of any preceding item, wherein the magnetic field shield is removably coupled to the magnetic base.

Item 43: The apparatus of any preceding item, wherein each of the one or more base magnets and the one or more stabilizing mass magnets is a permanent magnet.

Item 44: The apparatus of any preceding item, further comprising:
at least one supplemental mass coupled to magnetic stabilizing mass to amplify at least one of the first magnetic repulsion force and the second magnetic repulsion force.

Item 45: The apparatus of any preceding item, wherein the at least on supplemental mass comprises a tungsten alloy.

Item 46: The apparatus of any preceding item, wherein:
the pivot assembly defines a pivot axis about which the magnetic stabilizing mass is pivotable between at least the first position and the second position,
the first magnetic repulsion force produces a first restoring moment about the pivot axis that urges the magnetic base to move in opposition to the oscillation, and
the second magnetic repulsion force produces a second restoring moment about the pivot axis that urges the magnetic base to move in opposite to the oscillation.

Item 47: The apparatus of any preceding item, wherein:
each of the one or more base magnets and the one or more stabilizing mass magnets is a polymagnet, and
the one or more housing magnets and the one or more stabilizing mass magnets are collectively positioned to generate a first magnetic attraction force that decreases relative to the offset of the magnetic stabilizing mass from the equilibrium position toward the first position, and a second magnetic attraction force that decreases relative to the offset of the magnetic stabilizing mass from the equilibrium position toward the second position.

Item 48: The apparatus of any preceding item, wherein:
the pivot assembly defines a pivot axis about which the magnetic stabilizing mass is pivotable between at least the first position and the second position,
the first magnetic repulsion force and the second magnetic attraction force together produce a first restoring moment about the pivot axis that urges the magnetic base to move in opposition to the oscillation, and
the second magnetic repulsion force and the first magnetic attraction force together produce a second restoring moment about the pivot axis that urges the magnetic base to move in opposition to the oscillation.

Item 49: The apparatus of any preceding item, wherein:
the magnetic stabilizing mass comprises a stabilizing mass body, and
a stabilizing mass spacer extending generally perpendicularly from the stabilizing mass body, the stabilizing mass spacer coupling the stabilizing mass body to the pivot assembly.

Item 50: The apparatus of any preceding item, wherein:
the one or more base magnets comprise a base first magnet at the base first end and a base second magnet at the base second end,
the one or more stabilizing mass magnets comprise a stabilizing mass first magnet at the stabilizing mass body first end and a stabilizing mass second magnet at the stabilizing mass body second end, and
the base first magnet is oriented to repel the stabilizing mass first magnet, and the base second magnet is oriented to repel the stabilizing mass second magnet.

Item 51: The apparatus of any preceding item, wherein:
the magnetic base comprises a base first end and a base second end opposite the base first end,
the stabilizing mass body comprises a stabilizing mass body first end and a stabilizing mass body second end opposite the stabilizing mass body first end,
in the first position, the stabilizing mass body first end is proximate to the base first end, and
in the second position, the stabilizing mass body second end is proximate to the base second end.

Item 52: The apparatus of any preceding item, wherein the magnetic base comprises a base first magnet recess to receive the base first magnet and a base second magnet recess to receive the base second magnet.

Item 53: The apparatus of any preceding item, wherein the base first magnet is press fit with the base first magnet recess and the base second magnet is press fit with the base second magnet recess.

Item 54: The apparatus of any preceding item, wherein the stabilizing mass body comprises a stabilizing mass first magnet recess to receive the stabilizing mass first magnet and a stabilizing mass second magnet recess to receive the stabilizing mass second magnet.

Item 55: The apparatus of any preceding item, the stabilizing mass first magnet is press fit with the stabilizing mass first magnet recess and the stabilizing mass second magnet is press fit with the stabilizing mass second magnet recess.

Item 56: The apparatus of any preceding item, wherein:
each of the first and second base magnets and each of the first and second stabilizing mass magnets are polymagnets,
the base first magnet and the stabilizing mass first magnet are oriented to form a first polymagnet pair and the base second magnet and the stabilizing mass second magnet are oriented to form a second polymagnet pair, the first polymagnet pair generates a first magnetic repulsion force that increases relative to an offset of the magnetic stabilizing mass from the equilibrium position toward the first position and a first magnetic attraction force that decreases relative to the offset of the magnetic stabilizing mass from the equilibrium position toward the first position, and the second polymagnet pair generates a second magnetic repulsion force that increases relative to an offset of the magnetic stabilizing mass from the equilibrium position toward the second position and a second attraction force that decreases relative to the offset of the magnetic stabilizing mass from the equilibrium position toward the second position.

Item 57: The apparatus of any preceding item, the pivot assembly constrains the magnetic stabilizing mass to pivoting between the first position and the second position along an arcuate path.

Item 58: The apparatus of any preceding item, further comprising an arm strap coupled to the magnetic base.

Item 59: The apparatus of any preceding item, further comprising a harness coupled to the magnetic base, the harness securable to the oscillating body.

Item 60: The apparatus of any preceding item, wherein the pivot assembly comprises at least one permanently lubricated self-aligning bearing.

Item 61: The apparatus of any preceding item, wherein the pivot assembly comprises a pin hinge.

Item 62: The apparatus of any preceding item, wherein the pivot assembly is coupled to the magnetic base at a midpoint between the base first end and the base second end.

Item 63: An apparatus for suppressing oscillations of an oscillating body, the apparatus comprising:
a magnetic base securable to the oscillating body;
a magnetic stabilizing mass pivotably coupled to the magnetic base by a pivot assembly, the magnetic stabilizing mass being pivotable between at least a first position and a second position, the magnetic stabilizing mass having an equilibrium position between the first position and the second position, each of the magnetic base and magnetic stabilizing mass being circular;
the magnetic base producing a base magnetic field that magnetically repels the magnetic stabilizing mass away from the first position at least when the magnetic stabilizing mass is offset from the equilibrium position toward the first position, and that magnetically repels the magnetic stabilizing mass away from the second position at least when the magnetic stabilizing mass is offset from the equilibrium position toward the second position;
wherein the pivot assembly comprises a spacer rod extending from a rod proximal end connected to the magnetic base to a rod distal end spaced apart from the magnetic base, the magnetic stabilizing mass pivotably coupled to the rod distal end.

Item 64: The apparatus of any preceding item, wherein:
the magnetic base comprises a plurality of base magnets distributed circumferentially around the magnetic base, and
the magnetic stabilizing base comprises a plurality of stabilizing mass magnets distributed circumferentially around the magnetic stabilizing base.

Item 65: The apparatus of any preceding item, wherein the plurality of base magnets are evenly distributed and the plurality of stabilizing mass magnets are evenly distributed.

Item 66: The apparatus of any preceding item, wherein each base magnet of the plurality of base magnets and a corresponding one of the plurality of stabilizing mass magnets are oriented to generate a magnetic repulsion force that is inversely correlated to a distance therebetween.

Item 67: The apparatus of any preceding item, wherein:
the magnetic stabilizing mass is pivotably coupled to the rod distal end by a ball and socket joint, the ball and socket joint defining a pivot axis about which the magnetic stabilizing mass is pivotable between at least the first position and the second position, and
the magnetic repulsion force produces a restoring moment about the pivot axis that urges the magnetic base to move in opposition to the oscillation.

Item 68: The apparatus of any preceding item, wherein the magnetic base and the magnetic stabilizing mass are concentric.

Item 69: The apparatus of any preceding item, further comprising a supplemental mass ring securable to the magnetic stabilizing mass to amplify the magnetic repulsion force.

Item 70: The apparatus of any preceding item, wherein the supplemental mass ring has a diameter slightly smaller than that of the magnetic stabilizing mass.

Item 71: The apparatus of any preceding item, wherein:
each base magnet and each stabilizing mass magnet are polymagnets,
each base magnet corresponds with one of the plurality of stabilizing mass magnets to form a plurality of polymagnet pairs, and
each polymagnet pair generates a magnetic repulsion force that is inversely correlated to a distance therebetween and a magnetic attraction force that is correlated to a distance therebetween.

Item 72: The apparatus of any preceding item, wherein the ball and socket joint constrains rotation of the magnetic stabilizing mass about the spacer rod relative to the magnetic base.

Item 73: The apparatus of any preceding item, wherein a diameter of the stabilizing mass diameter is about 105 to 140% larger than a diameter of the magnetic base.

Item 74: The apparatus of any preceding item, wherein the magnetic base comprises a plurality of base magnet recesses to receive a corresponding one of the plurality of base magnets.

Item 75: The apparatus of any preceding item, wherein each base magnet of the plurality of base magnets is press fit with a corresponding one of the base magnet recesses.

Item 76: The apparatus of any preceding item, wherein the magnetic stabilizing mass comprises a plurality of stabilizing mass magnet recesses to receive a corresponding one of the plurality of stabilizing mass magnets.

Item 77: The apparatus of any preceding item, wherein each stabilizing mass magnet of the plurality of stabilizing mass magnets is press fit with a corresponding one of the stabilizing mass magnet recesses.

Item 78: The apparatus of any preceding item, wherein the one or more base magnets comprise a base disc magnet having a base disc magnet diameter generally equal to the base diameter.

Item 79: The apparatus of any preceding item, wherein the one or more stabilizing mass magnets comprise a stabilizing mass disc magnet having a stabilizing mass disc magnet diameter generally equal to the stabilizing mass diameter.

Item 80: The apparatus of any preceding item, wherein the base disc magnet is oriented to repel the stabilizing mass ring magnet.

Item 81: The apparatus of any preceding item, wherein the base disc magnet and the stabilizing disc magnet form a polymagnet pair,
the polymagnet pair generates a magnetic repulsion force that is inversely correlated to a distance therebetween and a magnetic attraction force that is correlated to a distance therebetween.

Item 82: The apparatus of any preceding item, wherein the ball and socket joint permits the magnetic stabilizing mass to pivot relative the magnetic bass with three degrees of freedom.

Item 83: An apparatus for suppressing oscillations of an oscillating body, the apparatus comprising:
a circular magnetic base securable to the oscillating body, the magnetic base including a circular base magnet;
a circular magnetic stabilizing mass pivotably coupled to the magnetic base by a pivot assembly, the magnetic stabilizing mass being pivotable between at least a first position and a second position, the magnetic stabilizing mass having an equilibrium position between the first position and the second position, the stabilizing mass including a circular stabilizing mass magnet;
interaction between magnetic fields produced by the base magnet and the stabilizing mass magnet (i) magnetically repel the magnetic stabilizing mass away from the first position at least when the magnetic stabilizing mass is offset from the equilibrium position toward the first position, and (ii) magnetically repel the magnetic stabilizing mass away from the second position at least when the magnetic stabilizing mass is offset from the equilibrium position toward the second position;
wherein the pivot assembly comprises a spacer rod extending from a rod proximal end connected to the magnetic base to a rod distal end spaced apart from the magnetic base, the magnetic stabilizing mass pivotably coupled to the rod distal end.

Item 84: The apparatus of any preceding item, wherein the circular base magnet has a diameter generally equal to that of the magnetic base.

Item 85: The apparatus of any preceding item, wherein the circular stabilizing mass magnet has a diameter generally equal to that of the magnetic stabilizing mass.

Item 86: The apparatus of any preceding item, wherein the magnetic stabilizing mass is pivotably coupled to the rod distal end by a ball and socket joint.

The invention claimed is:

1. An apparatus for suppressing oscillations of an oscillating body, the apparatus comprising:
a magnetic base securable to the oscillating body;
a magnetic stabilizing mass pivotably coupled with at least two rotational degrees of freedom to the magnetic base by a pivot assembly, the magnetic stabilizing mass being pivotable with the at least two rotational degrees of freedom between at least a first position and a second position, the magnetic stabilizing mass having an equilibrium position between the first position and the second position; and
the magnetic base producing a base magnetic field that magnetically repels the magnetic stabilizing mass away from the first position at least when the magnetic stabilizing mass is offset from the equilibrium position toward the first position, and that magnetically repels the magnetic stabilizing mass away from the second position at least when the magnetic stabilizing mass is offset from the equilibrium position toward the second position,
wherein the magnetic base comprises one or more base magnets, which collectively produce the base magnetic field, and the magnetic stabilizing mass comprises one or more stabilizing mass magnets, which collectively produce a mass magnetic field extending generally toward the base magnetic field, and
wherein the pivot assembly comprises a spacer rod extending from a rod proximal end connected to the magnetic base to a rod distal end spaced apart from the magnetic base, the magnetic stabilizing mass pivotably coupled to the rod distal end.

2. The apparatus of claim 1, wherein:
the one or more base magnets and the one or more stabilizing mass magnets are collectively positioned to generate a first magnetic repulsion force that increases relative to an offset of the magnetic stabilizing mass from the equilibrium position toward the first position, and a second magnetic repulsion force that increases relative to an offset of the magnetic stabilizing mass from the equilibrium position toward the second position.

3. The apparatus of claim 2, further comprising at least one supplemental mass coupled to magnetic stabilizing mass to amplify at least one of the first magnetic repulsion force and the second magnetic repulsion force.

4. The apparatus of claim 2, wherein:
each of the one or more base magnets and the one or more stabilizing mass magnets is a polymagnet, and
the one or more base magnets and the one or more stabilizing mass magnets are collectively positioned to generate a first magnetic attraction force that decreases relative to the offset of the magnetic stabilizing mass from the equilibrium position toward the first position, and a second magnetic attraction force that decreases relative to the offset of the magnetic stabilizing mass from the equilibrium position toward the second position.

5. The apparatus of claim 1, wherein the pivot assembly defines a plurality of pivot axes about which the magnetic stabilizing mass is pivotable between at least the first position and the second position, and the plurality of pivot axes comprise a first pivot axis and a second pivot axis transverse to the first pivot axis.

6. The apparatus of claim 5, wherein the second pivot axis is orthogonal to the first pivot axis.

7. The apparatus of claim 1, wherein the magnetic stabilizing mass comprises opposed first and second stabilizing mass ends, the magnetic base comprises opposed first and second base ends, the magnetic base being connected to the rod proximal end at the first base end, and the magnetic stabilizing mass being pivotably coupled to the rod distal end at the first stabilizing mass end.

8. An apparatus for suppressing oscillations of an oscillating body, the apparatus comprising:
a magnetic base securable to the oscillating body; and
a magnetic stabilizing mass pivotably coupled to the magnetic base by a pivot assembly, the magnetic stabilizing mass being pivotable between at least a first position and a second position, the magnetic stabilizing mass having an equilibrium position between the first position and the second position the magnetic base producing a base magnetic field that magnetically repels the magnetic stabilizing mass away from the first position at least when the magnetic stabilizing mass is offset from the equilibrium position toward the first position, and that magnetically repels the magnetic stabilizing mass away from the second position at least when the magnetic stabilizing mass is offset from the equilibrium position toward the second position;

wherein the pivot assembly comprises a spacer rod extending from a rod proximal end connected to the magnetic base to a rod distal end spaced apart from the magnetic base, the magnetic stabilizing mass pivotably coupled to the rod distal end.

9. The apparatus of claim 8, wherein:
the magnetic base comprises a plurality of base magnets distributed thereon, and
the magnetic stabilizing mass comprises a plurality of stabilizing mass magnets distributed thereon.

10. The apparatus of claim 9, wherein each base magnet of the plurality of base magnets and a corresponding one of the plurality of stabilizing mass magnets are oriented to generate a magnetic repulsion force that is inversely correlated to a distance therebetween.

11. The apparatus of claim 10, wherein:
the magnetic stabilizing mass is pivotably coupled to the rod distal end by a ball and socket joint, the ball and socket joint defining a pivot axis about which the magnetic stabilizing mass is pivotable between at least the first position and the second position, and
the magnetic repulsion force produces a restoring moment about the pivot axis that urges the magnetic base to move in opposition to the oscillation.

12. The apparatus of claim 10, further comprising a supplemental mass securable to the magnetic stabilizing mass to amplify the magnetic repulsion force.

13. The apparatus of claim 9, wherein:
each base magnet and each stabilizing mass magnet are polymagnets,
each base magnet corresponds with one of the plurality of stabilizing mass magnets to form a plurality of polymagnet pairs, and
each polymagnet pair generates a magnetic repulsion force that is inversely correlated to a distance therebetween and a magnetic attraction force that is correlated to a distance therebetween.

14. The apparatus of claim 11, wherein the ball and socket joint constrains rotation of the magnetic stabilizing mass about the spacer rod relative to the magnetic base.

15. An apparatus for suppressing oscillations of an oscillating body, the apparatus comprising:

a magnetic base securable to the oscillating body;
a magnetic stabilizing mass pivotably coupled to the magnetic base by a pivot assembly that defines a plurality of pivot axes, the magnetic stabilizing mass being pivotable about the plurality of pivot axes between at least a first position and a second position, the magnetic stabilizing mass having an equilibrium position between the first position and the second position; and
the magnetic base producing a base magnetic field that magnetically repels the magnetic stabilizing mass away from the first position at least when the magnetic stabilizing mass is offset from the equilibrium position toward the first position, and that magnetically repels the magnetic stabilizing mass away from the second position at least when the magnetic stabilizing mass is offset from the equilibrium position toward the second position,
wherein the magnetic base comprises one or more base magnets, which collectively produce the base magnetic field, and the magnetic stabilizing mass comprises one or more stabilizing mass magnets, which collectively produce a mass magnetic field extending generally toward the base magnetic field,
wherein the one or more base magnets and the one or more stabilizing mass magnets are collectively positioned to generate a first magnetic repulsion force that increases relative to an offset of the magnetic stabilizing mass from the equilibrium position toward the first position, and a second magnetic repulsion force that increases relative to an offset of the magnetic stabilizing mass from the equilibrium position toward the second position, and
wherein each of the one or more base magnets and the one or more stabilizing mass magnets is a polymagnet, and the one or more base magnets and the one or more stabilizing mass magnets are collectively positioned to generate a first magnetic attraction force that decreases relative to the offset of the magnetic stabilizing mass from the equilibrium position toward the first position, and a second magnetic attraction force that decreases relative to the offset of the magnetic stabilizing mass from the equilibrium position toward the second position.

16. The apparatus of claim 15, wherein the plurality of pivot axes comprise a first pivot axis and a second pivot axis transverse to the first pivot axis.

17. The apparatus of claim 16, wherein the second pivot axis is orthogonal to the first pivot axis.

* * * * *